(12) United States Patent
Wo et al.

(10) Patent No.: US 7,385,768 B2
(45) Date of Patent: Jun. 10, 2008

(54) SYSTEM, METHOD AND DEVICE FOR RAPID, HIGH PRECISION, LARGE ANGLE BEAM STEERING

(75) Inventors: Yei Wo, East Brunswick, NJ (US); Steven A. DeChiaro, Freehold, NJ (US)

(73) Assignee: D + S Consulting, Inc., Eatontown, NJ (US)

( * ) Notice: Subject to any disclaimer, the term of this patent is extended or adjusted under 35 U.S.C. 154(b) by 248 days.

(21) Appl. No.: 11/392,854

(22) Filed: Mar. 29, 2006

(65) Prior Publication Data

US 2008/0112065 A1    May 15, 2008

Related U.S. Application Data

(60) Provisional application No. 60/738,771, filed on Nov. 22, 2005.

(51) Int. Cl.
G02B 17/00 (2006.01)
(52) U.S. Cl. ...................................... 359/727
(58) Field of Classification Search ................ 359/727, 359/726, 728, 729, 730, 731, 732, 733
See application file for complete search history.

(56) References Cited

U.S. PATENT DOCUMENTS

| | | |
|---|---|---|
| 4,823,402 A | 4/1989 | Brooks |
| 4,827,387 A | 5/1989 | Ferren et al. |
| 4,831,246 A | 5/1989 | Wallentine et al. |
| 4,831,333 A | 5/1989 | Welch |
| 4,854,687 A | 8/1989 | Fletcher |
| 4,945,459 A | 7/1990 | Ferren et al. |
| 5,015,080 A | 5/1991 | Cassarly et al. |
| 5,059,008 A | 10/1991 | Flood et al. |
| 5,392,157 A | 2/1995 | Shih |
| 5,504,630 A | 4/1996 | Hansen |
| 5,528,391 A | 6/1996 | Elrod |
| 5,633,695 A | 5/1997 | Feke et al. |
| 5,872,880 A | 2/1999 | Maynard |
| 5,909,296 A | 6/1999 | Tsacoyeanes |

(Continued)

FOREIGN PATENT DOCUMENTS

WO    WO-01/77748 A2    10/2001

(Continued)

OTHER PUBLICATIONS

Sievenpiper et al., A tunable impedance surface performing as a reconfigurable beam steering reflector, IEEE, Mar. 2002, pp. 384-390, vol. 3, No. 3.

(Continued)

*Primary Examiner*—Timothy J. Thompson
(74) *Attorney, Agent, or Firm*—Richard A. Catalina, Jr.

(57) ABSTRACT

A system, method and apparatus for rapid, large angle, high-precision steering of one or more beams of light, and in particular, laser beams, using one or more concave reflectors to provide narrow, essentially collimated output beams. The rapid, beam steering device amplifies the angular deflection provided by a small angle steering element by means of one or more concave reflecting surfaces while controlling the divergence of the output beam using a divergence control lens, to produce an essentially collimated output beam in a field of regard that subtends +/−45 degrees on one axis and +/−50 degrees on an orthogonal axis.

18 Claims, 17 Drawing Sheets

U.S. PATENT DOCUMENTS

| | | | |
|---|---|---|---|
| 6,137,926 | A | 10/2000 | Maynard |
| 6,252,667 | B1 | 6/2001 | Hill et al. |
| 6,271,923 | B1 | 8/2001 | Hill |
| 6,295,395 | B1 | 9/2001 | Paek |
| 6,313,918 | B1 | 11/2001 | Hill et al. |
| 6,317,251 | B1 | 11/2001 | Wang |
| 6,337,760 | B1 | 1/2002 | Huibers et al. |
| 6,373,620 | B1 | 4/2002 | Wang |
| 6,437,902 | B2 | 8/2002 | Daneman et al. |
| 6,453,084 | B1 | 9/2002 | Stanford et al. |
| 6,541,759 | B1 | 4/2003 | Hill |
| 6,631,004 | B1 | 10/2003 | Hill et al. |
| 6,680,788 | B1 | 1/2004 | Roberson et al. |
| 6,765,644 | B1 | 7/2004 | Anderson et al. |
| 6,785,437 | B2 | 8/2004 | Hagood et al. |
| 6,813,085 | B2 * | 11/2004 | Richards ............ 359/630 |
| 6,833,819 | B2 | 12/2004 | Lynch |
| 6,856,402 | B2 | 2/2005 | Hill |
| 6,894,818 | B1 | 5/2005 | Cicchiello et al. |
| 6,947,117 | B2 | 9/2005 | Anderson et al. |
| 6,965,351 | B1 * | 11/2005 | Miller et al. ............ 343/781 P |
| 2003/0024912 | A1 | 2/2003 | Gross et al. |
| 2004/0263924 | A1 | 12/2004 | Chao et al. |
| 2007/0091314 | A1 * | 4/2007 | Gupta et al. ............ 356/445 |

FOREIGN PATENT DOCUMENTS

| | | |
|---|---|---|
| WO | WO-01/98839 A2 | 12/2001 |
| WO | WO-02/086583 A1 | 10/2002 |

OTHER PUBLICATIONS

Ishikawa et al., An integrated micro-optical system for VCSEL-to-fiber active alignment, Sensors and Actuators, 2003, pp. 109-115, A 103, Elsevier.

Neilson et al., Compact free space crossconnect using individual collimators, Electronic Letters, Jan. 8, 2004, vol., 40 No. 1, IEE.

Kim et al., Large tilt angle electrostatic force actuated micro-mirror, IEEE Photonics Technology Letters, Nov. 2002, pp. 1569-1571, vol. 14, No. 11.

Suhonen et al., Scanning micromechanical mirror for fine-pointing units of intersatellite optical links, Smart Mater. Struct. 10 (2001) 1204-1210. Institute of Physical Publis.

Fan et al., Two-dimensional optical scanner with large angular rotation realized by self-assembled micro-elevator, 1998, pp. 107-108, IEEE.

Meline et al., Universal beam steering mirror design using the cross blade structure, Acquisition, Tracking, and Pointing VI, 1992, SPIE vol. 1697, pp. 424-442.

Khan et al., Demonstration of 3-dimensional wide angle laser beam scanner using liquid crystals, Optics Express, Mar. 8, 2004, pp. 868-882, vol. 12, No. 5, Optical Society of America.

Titus, Beam Steering and Light Deflection, www.lci.kent.edu/boslab/projects/light$_{13}$deflection/index.html.

Carrano, Increasing the effectiveness of steered agile beams, Microsystems Technology Office, 2002.

Tuantranont et al., MEMS-controllable microlens array for beam steering and precision alignment in optical interconnect systems, University of Colorado, Boulder, CO.

Baddeley, Laser transformation, Military Information Technology online edition, www.military-information-technology.com/print$_{13}$article.cfm?DocID=597.

McManamon, Putting on the Shift, Spie's OE Magazine, pp. 15-17, Apr. 2003.

Hallstig et al., Laser Beam Steering and Tracking using a Liquid Crystal Spatial Light Modulator, Swedish Defense Research Agency (FOI), Linkoping, Sweden.

Hunwardsen, Optical Phased Array Improves Liquid Crystal Devices Used in Laser Beam Steering Subsystems, www.nasatech.com/Briefs/Mar04/UE10304.html, Rockwell Scientific.

Gibson et al., Wide angle beam steering for Infrared Countermeasures applications, 2002, pp. 100-111, Proceedings of SPIE vol. 4723.

Goltsos et al., Agile beam steering using binary optics microlens arrays, Optical Engineering, Nov. 1990, pp. 1392-1397, vol. 29 No. 11, MIT.

Matkin, Steered agile beams program support for Army requirements, 2002, pp. 1-12, Proceedings of SPIE vol. 4489.

Leheny, Section II: Reprint of Broad Agency Announcement 99-25 "Steered Agile Beams (STAB)" from the Commerce Business Daily, May 10, 1999, Issue No. PSA-2342.

Winker, DARPA STAB Kickoff Meeting: Liquid Crystal Agile Beam Steering, Aug. 8, 2000, Rockwell Science Center, Thousand Oaks, CA.

* cited by examiner

SYSTEM, METHOD AND DEVICE FOR RAPID, HIGH PRECISION, LARGE ANGLE BEAM STEERING

CROSS REFERENCE TO RELATED APPLICATIONS

This application is related to, and claims priority from, U.S. Provisional Patent application Ser. No. 60/738,771 filed on Nov. 22, 2005 by Yei Wo and Steven A. DeChiaro titled "High Resolution Large Range Steered Agile Beam Device," the contents of which are hereby incorporated by reference.

FIELD OF THE INVENTION

The present invention relates to rapid, wide angle beam steering. More specifically, the present invention relates to a system, method and device for rapid, large angle, high precision steering of one or more beams of light, and particularly, to rapid, large angle steering of laser light beams using concave reflectors. In one preferred embodiment, the present invention is an electronically controlled, rapid and precise, piezo-actuated, large angle beam deflection system, method and device that utilizes reflective optics for amplifying the steering angle of the output beam that results in a field of regard that subtends +/−45 degrees on one axis and +/−50 degrees on an orthogonal axis.

BACKGROUND OF THE INVENTION

Precise and controllable delivery of laser beams to a desired location is an important technology with respect to telecommunications, military, and other general industrial applications. Beams of light having a low divergence, such as laser beams, play an important role in military and non-military systems, as they can provide a variety of functions, including, but not limited to, infrared countermeasures ("IRCM"), target designation, and communications, such as free-space optical communications. The most common means of obtaining such delivery is by using large, i.e., macroscopic, mechanically controlled mirrors, lenses and gimbals to steer laser beams. While this technology is mature, it is limited by, among other things, the mechanical nature of mirror movement. Furthermore, inertial properties of mechanically driven mirrors limit the speed with which steering can be changed. In addition, gimbaled or rotating mirrors or reflectors may be vulnerable to vibrations and accelerations.

With regard to military applications, such as infrared countermeasures (IRCM), target tracking and designation, and laser communications, at present, further improvement of these applications is hindered by the lack of small, lightweight, low cost, rapid laser beam steering, pointing, and tracking capabilities. The gimbaled and turret mounted laser systems that are currently available tend to be bulky, heavy, expensive and unsuitable for novel battlefield applications. Military applications would also benefit from an ability to emit multiple independently controlled laser beams and from adaptive optics technology. Each of these functions requires, or can benefit from, the ability to point, steer and track the beam. Current technologies have failed to deliver such abilities in accordance with military and defense requirements.

For example, laser beam or free-space optical communications is a particularly useful application of lasers to battlefield situations. The laser's highly directional beam provides the means for rapidly deployed, enormously high bandwidth, and highly secure point-to-point communications links over tactically significant ranges with good relay capability. These laser beam communications capabilities are, however, limited to communications between relatively large, fixed or slow moving objects, because of the slow speed, relatively large weight and significant power consumption of the current turret mounted, gimbaled laser beam steering systems. Employing current technologies, steered laser beams cannot, for instance, be used to provide communications links between rapidly moving or small vehicles such as, but not limited to, small unmanned flight vehicles, individual foot solders, terrestrial vehicles, or other manned or unmanned aircraft. This presents serious short comings in the era of "smart" battlefield and theater of engagement technologies.

Realizing the untapped, battlefield potential of laser beams, the U.S. Defense Advanced Research Agency ("DARPA") launched the Steered, Agile Beam ("STAB") initiative in 1999, seeking the development of new beam steering technologies. DARPA specified that the new beam steering technologies should be capable of achieving significant reductions in size, weight, power, and cost over conventional methods. The primary objective of the STAB program was to produce a means to rapidly steer a laser beam over a wide three dimensional angular range while maintaining optical alignment with mobile targets at lengthy target ranges. In particular, the list of potentially useful and desired characteristics of the STAB program include the following specifications and objectives: 1) the ability to achieve a steering field of regard of 180° Azimuth and +/−45° Elevation (i.e., the ability to steer or scan a laser beam better than +/−45°), 2) eye safe operation, 3) rapid acquisition of the intended receiver and maintenance of optical alignment with mobile targets at representative target ranges of from 500 m up to 2 or 3 km, 4) correction for atmospheric degradation (if required), 5) covert optical data communications at extremely high bandwidth or throughput, 6) the ability to operate in the presence of strong daylight, 7) side lobe suppression of better than 30 dB, 8) compatibility with current target designation and IRCM infrastructure, and 9) means for covert target designation. The present invention substantially achieves all of these objectives.

As a result of the STAB initiative, numerous new beam-steering applications have been identified; however, current beam-steering technology still does not exist to support the identified applications by the STAB program. Most current optical beam steering systems continue to be mechanically driven systems—in whole or in part—which are complex, bulky, imprecise and expensive, and require high power to produce desired acceleration of the components thereof. The steering of these systems is relatively slow and imprecise, still often requiring mechanical stabilization, and such systems are still sensitive to vibration and acceleration.

Such shortcomings not only fail to meet the basic battlefield objectives established by DARPA, but further permeate other potential applications that would benefit from rapid, wide-angle agile beam steering. For instance, in the near term, new technologies for beam-steering systems with regard to military aircraft must facilitate self-protection (techniques-based infrared countermeasures or IRCM), targeting, passive and active searching and tracking, and free-space optical communications. Moreover, these systems must accommodate, in the longer term, damage-and-degrade-based infrared countermeasures. The new beam steering technologies must also be "conformal" to the outer skin of a vehicle, such as an aircraft, in order to reduce aerodynamic drag, reduce radar cross section, and minimize the obscuration to adjacent electro-optic systems.

In such cases, the optical beam steering system must deflect or steer an optical beam through relatively large angles, and there is a requirement for both a high speed of deflection and a high degree of precision in positioning the beam. A purely mechanical mirrored beam system can cover a large angular field with high resolution, but the speed or agility of the beam is limited by mechanical inertia. Electro-optical, acousto-optical, and low-inertia mechanical beam deflection systems are capable of high speeds of steering, but have a limited number of resolvable angular positions, typically in the magnitude of +/−1.5-3.0 degrees, and constitute, therefore, small angle or "fine" angle beam steering. As such, there is a need for a rapid, high-angle and precise agile beam steering system for numerous military aircraft applications.

In addition, the ability to rapidly steer multiple beams from a small, light weight package will allow conformal mounting of IRCM systems across all vulnerable points of a military aircraft. Multiple beam steering will also enable deployment of target illumination and designation systems capable of simultaneous engagement of multiple targets. Current technologies have failed to produce a beam steering system able to scan large angles, rapidly and precisely, and with the capability of accommodating more than one beam.

Recent advances in micro component technologies such as liquid crystals, micro electromechanical systems (MEMS) and optical MEMS, resonant cavity photo detectors, micro-diffractive optics, adaptive optics, micro-cavity quantum well lasers, thin film and photonic bandgap materials, for example, offer new opportunities in the development of "chip-scale" Microsystems for steered laser beam applications. However, such technologies are unable to meet all of the objectives of the STAB program and, in particular, are simply unable to deliver rapid, wide-angle and high precision beam steering capabilities.

Beam steering for IRCM applications, therefore, continue to focus on "macro" approaches to resolving the high angle, high speed, high precision dilemma. As such, size and bulk—undesirable features of current macro approaches—continue to plague current beam steering technology. For example, with regard to IRCM technologies, the prior art includes steering mirrors, pointing gimbals and monochromatic electro-optical, beam steering mechanisms. Steering mirrors require output windows many times the size of the system optical entrance pupil to scan over a large field of regard. Unfortunately, the mirror form factor requirements greatly increases the overall size of the sensor package.

By way of demonstration, a particular gimbaled approach for an IRCM device involves use of an imaging system mounted in a dome that is gimbaled to provide a desired pointing angle. The gimbals must point the entire sensor to scan the field-of-regard. Unfortunately, for aircraft applications, this requires a mirror below the platform line, which necessitates a hole in the platform. In addition, the dome and optical assembly is bulky, typically requires considerable volume, and has a radar cross-section which tends to increases the observe-ability of the vehicle.

Other approaches to an IRCM device have been suggested that would utilize existing technologies, such as a ball-turret recessed into the vehicle body. However, the downside of this approach is that, in order to obtain a full field of regard, a large window is required. This approach is further not feasible because the ball-turret must be deeply recessed and positioned within the body of the vehicle. Such an approach would simply utilize too much space within the aircraft vehicle.

Another approach that has been suggested as a conformal package is to implement a rotating prisms concept, which utilizes two prisms that rotate against each other. However, this approach is not desirable because the system is not entirely reflective, and as a result, there is a pointing error among different colors of the spectrum.

There are many other important applications which call for optical beam steering. One of these applications is free space optical communications, which is important to the telecommunications, cable and satellite television industries, as well as the military, as noted above.

From a military perspective, for example, communications networks that form the backbone of tactical communications are most often bulky, heavy, and time consuming to put into operation. Shortfalls in standard military tactical communications include the following:

Frequency allocation is a serious problem.
Bandwidth is too narrow for some traffic needs.
Radio frequency ("RF") omni-directional emissions allow targeting of defense systems.
Very limited use during periods of radio silence.
RF traffic more easily intercepted by the enemy.
RF signals can be jammed.
Time to set up and relocate RF stations (MSE) takes too long.
Use of wire as an alternative is costly, time consuming and somewhat inflexible.

Free-space optical communication has a number of advantages over RF communications, not least in the area of security. High performance laser systems have an inherently high level of link transmission security due to the very narrow transmitter beam width. It is necessary to directly interrupt the beam in order to access information, and this is both exceedingly difficult to achieve and easily detectable. For the same reasons, it causes no interference with nearby RF sources. Because lasers operate at a much higher frequency, moreover, they are able to achieve an exponential data throughput improvement. Transferring responsibility for throughput from satellite communication frequencies and into the free-space optical communication world will also free up RF for other military users and for applications that free-space optical communication cannot meet.

Accordingly, there is a need for a beam steering system capable of rapid operation over a wide angular field, and with a high degree of precision. The present invention satisfies this need.

The present invention successfully implements substantially of the aforementioned requirements, including, but not limited to, the DARPA STAB program objectives. The design of the present invention incorporates a high precision small angle steering element or "seeder" utilizing modern technologies such as, but not limited to, electro-optical, acousto-optical, opto-ceramic or piezoelectric actuators and a larger angle steering or amplification feature that is accomplished by spherical reflective devices, e.g., concave mirrors, which amplify the steering angle rendered by the fine-steering element. The novelty of the invention is represented by the amplification of a relative small steering angle, typically less than +/−1.5 degrees to a large steering angle, +/−45 degrees by one or more, but preferably two (2), curved reflectors. Indeed, the present invention can work with most, if not all, of the known small angle "seeder" or steering devices, including such non-mechanical technologies utilizing liquid crystal (LC) or other technologies known to those skilled in the art regarding rapid, small angle, high precision beam steering. The small angle steering can be achieved by any technology with high precision. The invention utilizes the reflection laws of physics and the tremendous speed ($3 \times 10^8$ meters per second) at which the light travels, and solves the problems of many other steering schemes, which usually have less than +/−25 degrees of 2-dimensional steering range. To date, no embodiments of the aforementioned concept have been successfully reduced to practice and the prior art has largely failed to successfully accomplish rapid, high precision, large angle beam steering. The present invention accomplishes precise, large angle beam steering in an eloquent fashion.

SUMMARY OF THE INVENTION

The present invention relates to rapid, wide angle beam steering. More specifically, the present invention relates to a system, method and device for rapid, large angle, high precision steering of one or more beams of light, and particularly, to rapid, large angle steering of laser light beams using concave reflectors. In one preferred embodiment, the present invention is an electronically controlled, rapid and precise, piezo-actuated, large angle beam amplification system, method and device that utilize reflective optics for amplifying the steering angle of the output beam that results in a field of regard that subtends +/−45 degrees on one axis and +/−50 degrees on an orthogonal axis.

In a preferred embodiment, the rapid beam steering device or system includes a small angle steering element positioned to steer a beam of laser light over a first range of angles towards a concave reflecting surface such as a spherical mirror. The focal length, size and position of the spherical mirror are chosen such that the reflected beam traverses a significantly wider range of angles, i.e., the concave reflecting surface effectively amplifies the angular steering of the small angle steering element. In addition, the rapid beam steering device includes a divergence control lens. In a preferred embodiment of the invention, the focal length and position of the divergence control lens are selected so as to focus the laser beam to a surface that is essentially the focal length of the concave reflecting surface short of the concave reflecting surface. This arrangement of elements results in a reflected beam that is essentially collimated.

In further embodiments of the invention, the rapid beam steering system or device may include a second mirror. This may be a flat mirror utilized to fold the design to make it more compact or the second mirror may be another concave reflecting surface used to further increase the angular amplification of the small angle steering element. In addition, the optical components, particularly the concave mirrors, may be used in off-axis configurations to allow the output beam to sweep over a large solid angle without obstruction.

These and other features of the invention will be more fully understood by references to the following drawings.

DETAILED DESCRIPTION

Figure 1:
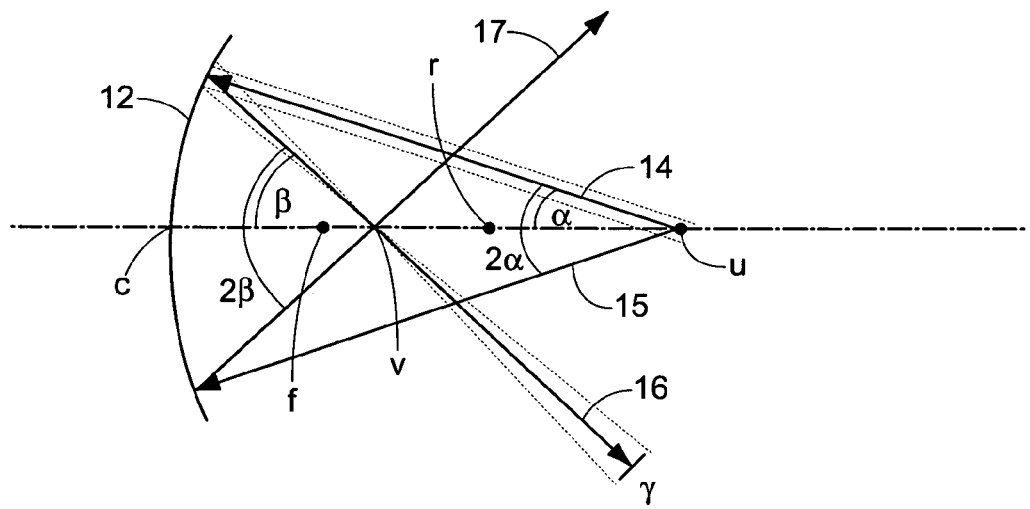
FIG. 1 is a schematic drawing showing a spherical reflecting surface amplifying a beam steering angle.

The present invention relates to rapid, wide angle beam steering. More specifically, the present invention relates to a system, method and device for rapid, large angle, high precision steering of one or more beams of light, and particularly, to rapid, large angle steering of laser light beams using concave reflectors.

Small angle laser beam steering technologies are well known. For instance, there are multiple technologies that can provide laser beam steering over ranges of the order of +/−1.5 degrees or other similar small angular ranges. These devices typically use electrically controlled actuators and other devices and may include, but are not limited to, liquid crystal (LC) technologies (e.g., liquid crystal light modulators, liquid crystal digital light deflectors, liquid crystal phase shifters, zero-twist nematic liquid crystal spatial light modulators, liquid crystal optical phased arrays (such as that developed by Rockwell Scientific Co.), among many such liquid crystal based devices), micro electromechanical systems (MEMS) and optical MEMS, resonant cavity photo detectors, micro-diffractive optics, adaptive optics, thin film, photonic bandgap materials, electro-optical, acousto-optical, opto-ceramic and piezo-electric actuators. These small angle beam steering technologies have some of the characteristics that the U.S. Defense Advanced Research Agency (DARPA) is seeking in its STAB initiative, such as rapid and accurate direction control using equipment that is small, light and relatively low cost. These small angle beam steering technologies do not, however, incorporate or embody the most important required characteristic, which is the ability to steer the beam over large angles, preferably of the order of +/−45 degrees, in a rapid and precise manner.

Presently, the only available means of obtaining delivery of large angle beam steering is with the use of large, i.e., macroscopic, mechanically controlled mirrors, lenses and gimbals to steer laser beams. Most current optical beam steering systems continue to be mechanically driven systems that are complex, bulky, imprecise and expensive, and require high power to produce desired acceleration of the components thereof. While this technology is mature, it is limited by, among other things, the mechanical nature of mirror movement. Furthermore, inertial properties of mechanically driven mirrors limit the speed with which steering can be changed. The steering of these systems is relatively slow and imprecise, still often requiring mechanical stabilization, and such systems are sensitive to vibration and acceleration In a preferred embodiment of the current invention, the short comings of the small angle laser beam steering (fine steering) technologies and the macro-mechanical, large angle beam steering technologies are overcome by amplifying the angular steering of small angle laser beam steering technologies using a novel arrangement of low cost, conventional reflection and refraction optics that also control the beam divergence, resulting not only in precise and rapid steering range amplification on the order of +/−45 degrees, but also steering speed acceleration amplification due to the fact that light travels at enormous speeds. Thus, according to a preferred embodiment of the present invention, rapid, large angle and precise steering of one or more beams of light is achieved, thereby overcoming the shortcomings of present day small angle and large angle technologies.

Significantly, preferred embodiments of the present invention are able to scan a beam, preferably a laser beam, from one angle representing an extreme final output angle in a field of regard of +45 degrees to an opposite, extreme final output angle in the field of regard of −45 degrees (thereby steering the laser beam a total of approximately 90 degrees within the field of regard of +/−45 degrees), and are able to employ a random accessibility of a beam within the field of regard of +/−45 degrees, all in the order of several nanoseconds to slightly less than 1 millisecond (<1 ms), depending on the speed of the small angle seeder or steering technology utilized, which may be an all electronic and non-mechanical small angle seeder or steering element, or which may be an electronic small angle seeder or steering element with slight mechanical properties, such as an electronically controllable small angle steered planar mirror controlled by piezo-electric controllers or actuators. Virtually any small angle seeder or steering technology, device or system may be incorporated into the present invention. For example, where higher speed and enhanced performance are desired, a small angle steering element such as a seeder utilizing MEMS technology may be used in the present invention, thereby achieving a full field of regard scan (approximately 90 degrees or +/−45 degrees) at extremely high speed. One of ordinary skill in the art will realize that the invention disclosed within is not restricted to any specific small angle seeder or steering element or device, and that speed and performance of the invention may be adjusted by utilizing faster and more enhanced performance seeders or small angle steering elements at an increased cost. The utilization of various small angle seeders or steering elements in accordance with the present invention in its various embodiments shall be readily known to those skilled in the art. As such, the present invention is not limited to the present small angle seeder or steering technology and as that technology develops in the future, it may be readily adapted to the present invention and its range amplification properties as demonstrated herein.

In order to better understand the present invention, it is useful to first consider some simpler embodiments of the invention and the limitations of those embodiments before considering the preferred embodiments. These will be discussed with reference to the accompanying drawings in which, as far as possible, like numbers and other references refer to like elements.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

FIG. 1 is a schematic drawing showing a spherical reflecting surface amplifying a beam steering angle.

In particular, FIG. 1 shows how a concave reflecting surface having at least one focal point may be used to amplify the angle through which a beam is steered. For simplicity, a sphere having an optical axis along the line c-u is chosen as the concave reflecting surface 12. A narrow beam of light from a reasonably collimated light source is directed towards the concave reflecting surface 12 via the point u. For simplicity, only the two beams representing the extremes of beam steering in one plane are shown in FIG. 1. At the one extreme of the steering range, the beam 14 passes through or originates from the point u at an angle $\alpha$ radians to the optical axis c-u. The beam 14 is reflected off the reflecting surface 12 as beam 16 passing through the point v on the optical axis, making an angle $\beta$ radians with respect to the optical axis. The distances c-v and c-u may be calculated from the focusing properties of a concave spherical mirror for paraxial rays. This may take the form of the equation $1/v+1/u=1/f=2/r$ (and thus, $f=r/2$ in this configuration), where f is the focal length c-f and r is the radius of curvature of the sphere.

At the other extreme of the steering range, the beam 15 passing through or originating from the point u is reflected as the beam 17 also passing through the point v on the optical axis. In this way, a beam steered through or originating from u over a range of solid angle of $2\alpha$ steradians has the range of angles of steering amplified to $2\beta$ steradians by reflecting surface 12. This phenomenon is illustrated in FIG. 1 for the case when the concave reflecting surface is a sphere, and the range of angles is small enough for the paraxial ray approximation to be a valid approximation.

A significant shortcoming of the simple beam amplification scheme of FIG. 1 is that the beam 16 having an amplified steering angle is a diverging beam, as shown by the divergence angle γ of beam 16. This beam divergence is a result of the focusing effect of the reflecting surface 12 on the rays of light making up beam 14 when reflected to become reflected beam 16. Having a diverging beam 16 limits the useful range of the reflected beam 16.

Figure 1A:
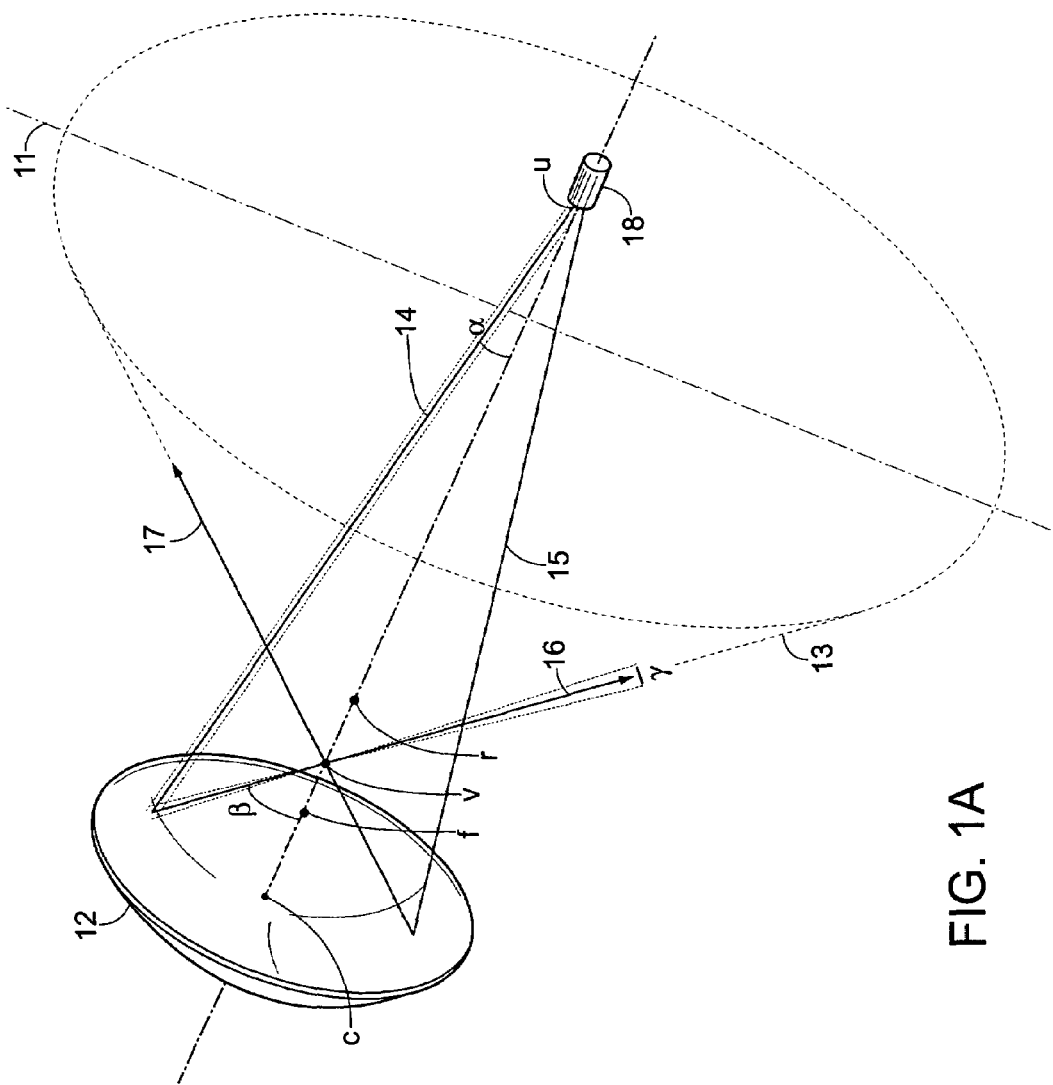
FIG. 1A is a drawing of a perspective view of the device illustrated in FIG. 1, showing a spherical reflecting surface amplifying a beam steering angle.

FIG. 1A is a perspective drawing of the device illustrated in FIG. 1, showing a spherical reflecting surface amplifying a beam steering angle.

In particular, FIG. 1A shows how a concave reflecting surface having at least one focal point may be used to amplify the angle through which a beam is steered. For simplicity, a sphere having an optical axis along the line c-u is chosen as the concave reflecting surface 12. A narrow beam of light from a reasonably collimated light source 18 is directed towards the concave reflecting surface 12 via the point u. Again, for simplicity, only two beams representing the extremes of beam steering in only one two-dimensional plane 11 (out of an infinite number of possible planes) passing through the optical axis are shown in FIG. 1A. At the one extreme of the steering range, the beam 14 passes through or originates from the point u at an angle α radians to the optical axis. In FIG. 1A, the beam 14 originates at point u from a light beam source 18, such as, but not limited to, a laser light source. The beam 14 is reflected off the reflecting surface 12 as beam 16 passing through the point v on the optical axis, making an angle β radians with respect to the optical axis. The distances c-v and c-u may be calculated from the focusing properties of a concave spherical mirror for paraxial rays. Again, this may take the form of the equation $1/v + 1/u = 1/f = 2/r$ (and thus, $f = r/2$ in this configuration), where f is the focal length c-f and r is the radius of curvature of the sphere.

At the other extreme of the steering range plane in FIG. 1A, the beam 15 passing through or originating from the point u is reflected off of the concave reflecting surface 12 as the beam 17 passing through the point v on the optical axis. In this way, a beam steered through or originating from u over a range of solid angle of 2α steradians has the range of angles of steering amplified to 2β steradians by reflecting surface 12. This phenomenon is illustrated in FIG. 1 and FIG. 1A for the case when the concave reflecting surface is a sphere, and the range of angles is small enough for the paraxial ray approximation to be a valid approximation.

The three dimensional cone 13 emanating from point v on the optical axis represents a theoretical field of regard for beams reflected from surface 12 in this configuration, initially originating or passing through point u, and depending on the precise shape of the concave reflecting surface 12 and the precise location of points c and u. Output beams 16 and 17, being extremes of beam steering in only one two-dimensional plane 11 (out of an infinite number of possible planes) are oriented 180° from each other with respect to the optical axis.

Again, a significant shortcoming of the simple beam amplification scheme of FIG. 1A is that the beam 16 having an amplified steering angle is a diverging beam, as shown by the divergence angle γ of beam 16. This beam divergence is a result of the focusing effect of the reflecting surface 12 on the rays of light making up beam 14 when reflected to become reflected beam 16. Having a diverging beam 16 limits the useful range of the reflected beam 16.

In the above embodiments and examples, and in the embodiments and examples to follow, it should be noted that the concave reflective surface 12 is not limited to only a concave reflecting surface that is a sphere or is spherical, but is meant to further include, without limitation, concave reflecting surfaces that are aspherical, cylindrical, paraboloidal, ellipsoidal, hyperboloidal, or any other suitable curved three-dimensional shape, with the appropriate modification(s) to the respective embodiment utilizing a non-spherical concave reflecting surface based on the particular focal properties and behavior of such non-spherical reflecting surface, as would be appreciated by one skilled in the art. However, as shown in the embodiment in FIGS. 1 and 1A, the concave reflecting surface 12 is a spherical reflector, and the principles and methodology set forth regarding this embodiment are based on and calculated from the focusing properties of a concave spherical mirror for paraxial rays.

Figure 2:
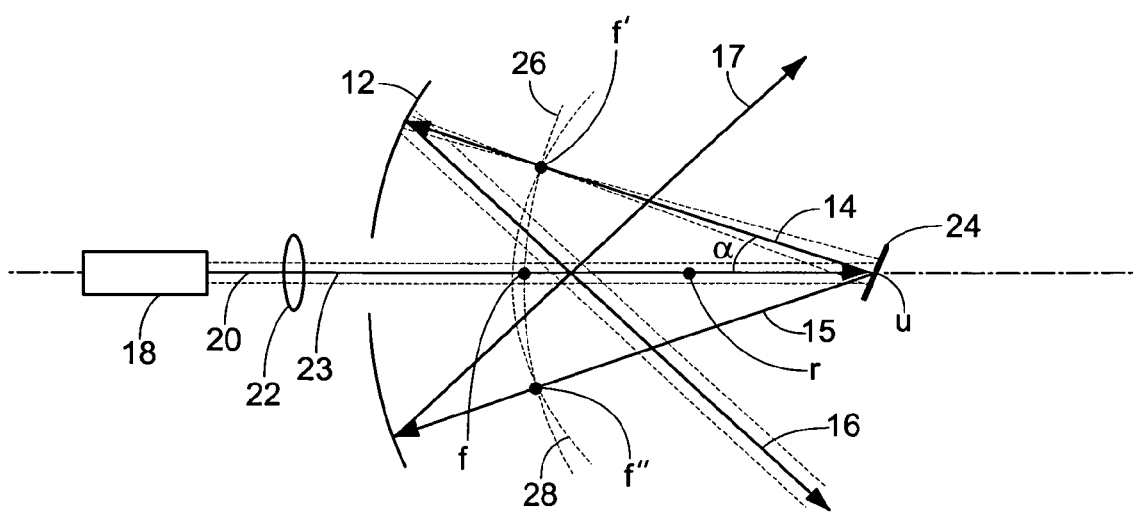
FIG. 2 is a schematic drawing showing a beam steering apparatus having a spherical reflecting surface and a reasonably collimated output beam.

FIG. 2 is a schematic drawing showing a beam steering apparatus having a spherical reflecting surface and a reasonably collimated output beam, i.e. having an acceptable divergence of about ½ micro-radian.

Although the concave reflecting surface 12 in the apparatus illustrated in FIG. 2 is a sphere or is spherical in shape, it should be noted that this embodiment is not limited to only a concave reflecting surface that is a sphere or is spherical, but is meant to further include, without limitation, concave reflecting surfaces that are aspherical, cylindrical, paraboloidal, ellipsoidal, hyperboloidal, or any other suitable curved three-dimensional shape, with the appropriate modification(s) to an embodiment utilizing a non-spherical concave reflecting surface based on the particular focal properties and behavior of such non-spherical reflecting surface, as would be appreciated by one skilled in the art. However, as shown in the embodiment in FIG. 2, the concave reflecting surface 12 is a spherical reflector, and the principles and methodology set forth regarding this embodiment are based on and calculated from the focusing properties of a concave spherical mirror for paraxial rays.

The beam steering apparatus of FIG. 2 includes a reasonably collimated light source 18 that emits a beam of light 20 such as, but not limited to, a laser light source. This beam of light is directed via an opening in the concave reflecting surface 12 to a small angle steering element 24 located at the point u. The small angle steering element 24 may be, but is not limited to, an electronically controllable small angle steered planar mirror controlled by piezoelectric controllers such as the S-330 piezo tip/tilt platforms supplied by Physik Instrumente (PI) GmbH & Co. KG of Karlsruhe, Germany. These devices have a tip/tilt range of 2 mrad and provide 4 mrad optical beam deflection with sub-µrad resolution and are designed for mirrors up to 50 mm in diameter. In addition, these devices are capable of steering the beam, within the parameters of the instrument, to a fixed point or fixed angle, stopping and holding the steered beam at said fixed point or fixed angle for any period of time as may be desired, as opposed to beam steering devices that perform constant resonance scanning. This allows full scale deflection to be scanned in about or slightly less than 1 millisecond (<1 ms). The small angle steering element of FIG. 2 may also be, but is not limited to, an acousto-optical deflector, a micro-electro-mechanical systems (MEMS) micro-mirror, a Strontium Barium Niobate (SBN) electro-optical crystal or an opto-ceramic system, or any other suitable small angle beam steering device, preferably a reflective small angle steering device.

As previously noted, the present invention as demonstrated in FIG. 2 is not limited to any particular small angle seeder or steering device. Essentially any small angle seeder or steering device as known to those skilled in the art may be used as small angle steering element 24 in this embodiment. One of ordinary skill in the art will realize that the invention disclosed within is not restricted to any specific small angle seeder or steering element or device, and that speed and performance of the invention can be adjusted by utilizing faster and more enhanced performance seeders or small angle steering elements at an increased cost. The utilization of various small angle seeders or steering elements in accordance with the invention disclosed in FIG. 2 and its various embodiments shall be readily known to those skilled in the art. As such, the present invention is not limited to the present small angle seeder or steering technology and as that technology develops in the future, it may readily be adapted to the present invention and its range amplification properties as demonstrated herein.

After passing through a divergence control focusing lens 22, the focused light 23 is directed via an opening in the concave reflecting surface 12 to a small angle steering element 24. The small angle steering element 24 is positioned at point u and steers the beam 23 as a reflected beam onto the concave reflecting surface 12. For simplicity, only two beams representing the extremes of the steering range in one plane are shown in FIG. 2. At one end of the range, the beam 23 is deflected as beam 14 to the concave reflecting surface 12 from where it is reflected as beam 16. At the other end of the range, the beam is deflected as beam 15 to concave reflecting surface 12 from where it is reflected as beam 17. In the system of FIG. 2, the divergence control lens 22 focuses the beam 20, as beam 23, emitted by light source 18 to a surface 28, above the concave reflecting surface 12. Surface 26 represents a second such surface passing through focal point f and being parallel to concave reflecting surface 12. The surfaces 26 and 28 coincide or intersect at the point that beams 14 and 15 pass through them, represented by points f' and f'' respectively. This means that beam 14, in this configuration, is focused at surface 26, being that surface 28 and surface 26 coincide at point f'. Since surface 26 is parallel to concave reflecting surface 12, but separated from it by a distance equal to the focal length f of the reflecting surface 12, the result is that, within the approximations of paraxial rays, the final reflected output beam 16 is a collimated beam.

A shortcoming of the beam steering apparatus of FIG. 2 is that although surfaces 26 and 28 are coincident for beams 14 and 15 (at points f' and f'', respectively), in general, the surfaces do not coincide as a whole. As such, although the divergence is reduced throughout the steering range, there is nonetheless some residual divergence at beam steering angles other than the extreme angle of the range as demonstrated in this drawing by beams 14 and 15.

Figure 3:
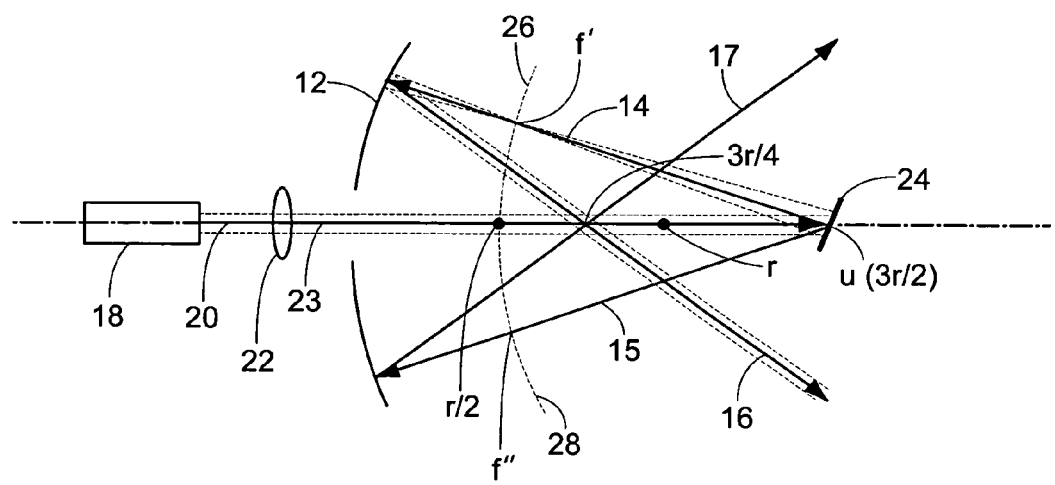
FIG. 3 is a schematic drawing showing a beam steering apparatus having a spherical reflecting surface and a well-collimated output beam.

FIG. 3 is a schematic drawing showing a beam steering apparatus having a spherical reflecting surface and a well-collimated output beam, which may have a beam divergence of ½ micro-radian or less.

Although the concave reflecting surface 12 in the apparatus illustrated in FIG. 3 is a sphere or is spherical in shape, it should be noted that this embodiment is not limited only to a concave reflecting surface that is a sphere or is spherical, but is meant to further include, without limitation, concave reflecting surfaces that are aspherical, cylindrical, paraboloidal, ellipsoidal, hyperboloidal, or any other suitable curved three-dimensional shape, with the appropriate modification(s) to an embodiment utilizing a non-spherical concave reflecting surface based on the particular focal properties and behavior of such non-spherical reflecting surface, as would be appreciated by one skilled in the art. However, as shown in the embodiment in FIG. 3, the concave reflecting surface 12 is a spherical reflector, and the principles and methodology set forth regarding this embodiment are based on and calculated from the focusing properties of a concave spherical mirror for paraxial rays.

The beam steering apparatus of FIG. 3 includes a reasonably collimated light source 18 that emits a beam of light 20 such as, but not limited to, a laser light beam. In the system of FIG. 3, there is also a divergence control lens 22 that focuses the beam 20 emitted by light source 18, now as focused beam 23, to surface 28, which, in this case, coincides in its entirety with surface 26, wherein surface 26 represents a surface passing through focal point f, is parallel to concave reflecting surface 12, and is separated from concave surface 12 by a distance equal to the distance of focal length f of the concave reflecting surface 12, or at a distance of r/2 in this configuration, where r is the radius of the curvature of the sphere that is the concave reflecting surface 12. After passing though divergence control lens 22, the focused beam of light 23 is directed via an opening in the concave reflecting surface 12 to a small angle steering element 24 located at the point u, which is located at a distance of 3r/2 from the reflecting surface 12 on the optical axis, where r is the radius of the curvature of the sphere that is the concave reflecting surface 12. In this embodiment, the small angle steering element 24 may be, but is not limited to, an electronically controllable small angle steered planar mirror controlled by piezoelectric controllers. The small angle steering element may also be, but is not limited to, an acousto-optical deflector, a micro-electro-mechanical systems (MEMS) micro-mirror, a Strontium Barium Niobate (SBN) electro-optical crystal or an opto-ceramic system, or any other suitable small angle beam steering device, preferably a reflective small angle steering device.

The present invention as demonstrated in FIG. 3 is not limited to any particular small angle seeder or steering device. Essentially any small angle seeder or steering device as known to those skilled in the art may be used as small angle steering element 24 in this embodiment. One of ordinary skill in the art will realize that the invention disclosed within is not restricted to any specific small angle seeder or steering element or device, and that speed and performance of the invention can be adjusted by utilizing faster and more enhanced performance seeders or small angle steering elements at an increased cost. The utilization of various small angle seeders or steering elements in accordance with the invention disclosed in FIG. 3 and its various embodiments shall be readily known to those skilled in the art. As such, the present invention is not limited to the present small angle seeder or steering technology and as that technology develops in the future, it may readily be adapted to the present invention and its range amplification properties as demonstrated herein.

The small angle steering element 24 in FIG. 3 is positioned at a point that is a distance 3r/2 from the concave reflecting surface 12 along the optical axis, where r is the radius of curvature of the sphere that is the concave reflecting surface 12 and steers the beam 23 as reflected beams 14 and 15 to reflecting surface 12. Again, for simplicity, only two beams representing the extremes of the steering range in one plane are shown in FIG. 3. At one end of the range, the beam 23 is deflected from the small angle steering element 24 as beam 14 to concave reflecting surface 12 from where it is reflected as beam 16. At the other end of the range, the beam is deflected from the small angle steering element 24 as beam 15 that becomes beam 17 on reflection from concave reflecting surface 12.

In the system of FIG. 3, the divergence control lens 22 focuses the beam 20 emitted by light source 18, now as focused beam 23, to surface 28, which coincides throughout its entire surface with surface 26. Again, surface 26 represents a surface passing through focal point f, is parallel to concave reflecting surface 12, and is separated from concave reflecting surface 12 by a distance equal to the focal length f of the concave reflecting surface 12. Because surfaces 26 and 28 coincide throughout and at the points that beams 14 and 15 pass through them, again represented by points f' and f" respectively, any beam originating from source 18 and passing through and being focused by lens 22 to surface 28 results in a collimated beam (e.g., beam 16), since surface 28 coincides throughout its entire surface with surface 26, i.e., both surfaces are identical. This means that beam 14 is focused at a distance equal to the focal length of the reflecting surface 12 from the surface, being surface 28, with the result that, within the approximations of paraxial rays, the reflected beam 16 is a collimated beam.

In FIG. 3, as a result of the positioning of small angle steering element 24 at 3r/2 from concave surface 12 along the optical axis, surfaces 26 and 28 coincide and beams 15 and 17 are deflected through a point that is 3r/4 from the sphere on the optical axis. This means that within the paraxial ray approximation, all of the final output beams deflected by the system of FIG. 3 (e.g., final reflected output beams 16 and 17), wherein surface 28 and surface 26 coincide throughout, are collimated, irrespective of where a beam is directed from small angle steering element 24 to concave reflecting steering surface 12, as long as the beam is focused to surface 28, which, in this configuration, is coincident throughout with surface 26.

Although the configuration in FIG. 3 results in a collimated beam steered at any angle by small angle steering element 24 within this configuration, as amplified thereafter by the concave reflecting surface 12, the system of FIG. 3 has a significant drawback in the amount of amplification of the range of the beam steering angle is fixed at 2. That is, the concave reflecting surface will only double the amplification of the steering range of the small angle steering element 24. As such, if the steering range of the small angle steering element 24 is +/−3 degrees, the final output steering range of the device illustrated in FIG. 3 is +/−6 degrees.

Figure 3A:
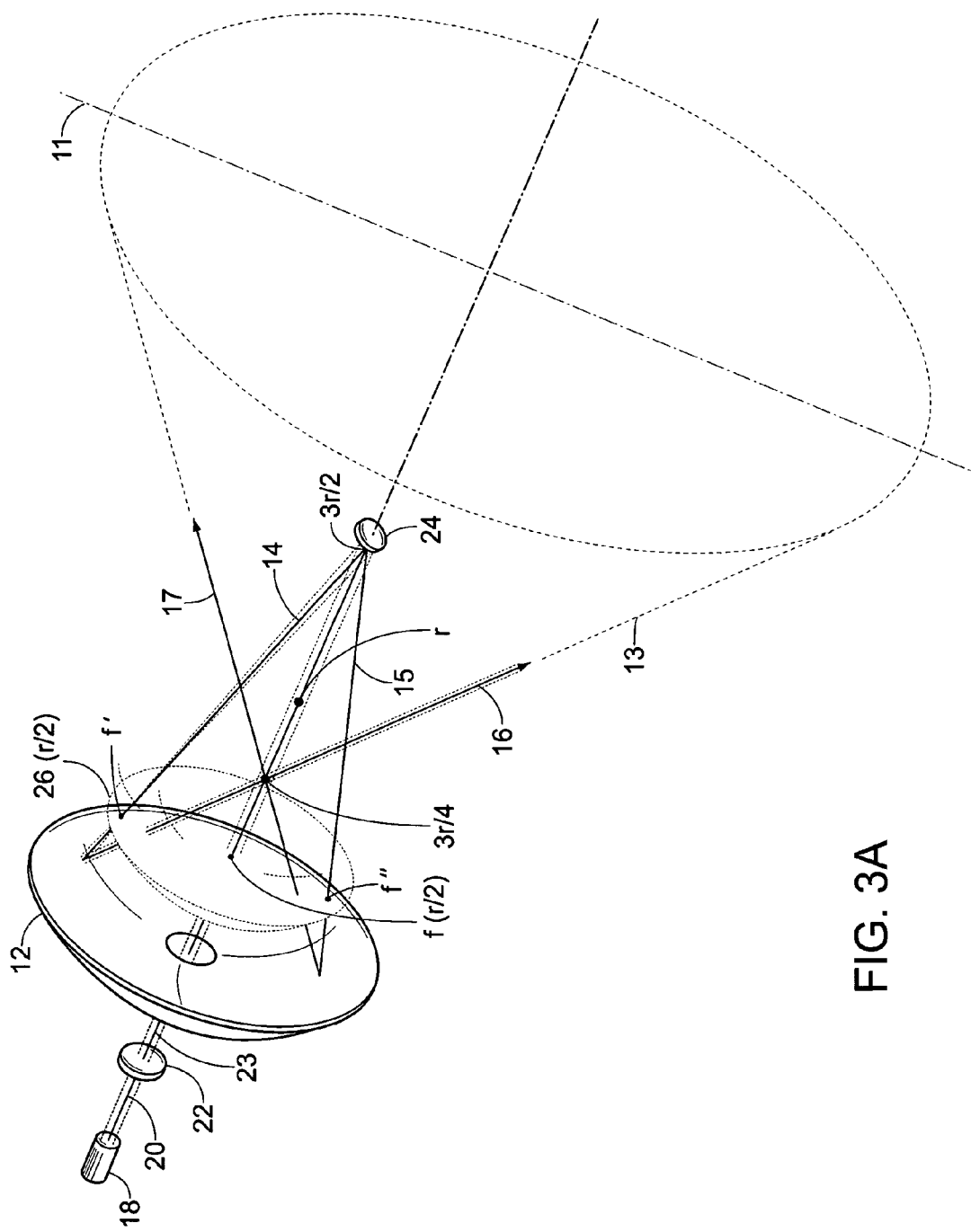
FIG. 3A is drawing of a perspective view of the invention illustrated in FIG. 3, showing a beam steering apparatus having a spherical reflecting surface and a well-collimated output beam.

FIG. 3A is a drawing of a perspective view of the invention illustrated in FIG. 3, showing a beam steering apparatus having a spherical reflecting surface and a well-collimated output beam, which may have a beam divergence of ½ micro-radian or less.

Although the concave reflecting surface 12 in the apparatus illustrated in FIG. 3A is a sphere or is spherical in shape, it should be noted that this embodiment is not limited only to a concave reflecting surface that is a sphere or is spherical, but is meant to further include, without limitation, concave reflecting surfaces that are aspherical, cylindrical, paraboloidal, ellipsoidal, hyperboloidal, or any other suitable curved three-dimensional shape, with the appropriate modification(s) to an embodiment utilizing a non-spherical concave reflecting surface based on the particular focal properties and behavior of such non-spherical reflecting surface, as would be appreciated by one skilled in the art. However, as shown in the embodiment in FIG. 3A, the concave reflecting surface 12 is a spherical reflector, and the principles and methodology set forth regarding this embodiment are based on and calculated from the focusing properties of a concave spherical mirror for paraxial rays.

The beam steering apparatus of FIG. 3A includes a reasonably collimated light source 18 that emits a beam of light 20 such as, but not limited to, a laser light beam. In the system of FIG. 3A, there is also a divergence control lens 22 that focuses the beam 20 emitted by light source 18, as focused beam 23, to surface 28, which, in this case, coincides in its entirety with surface 26, wherein surface 26 represents a surface passing through focal point f, is parallel to concave reflecting surface 12, and is separated from concave surface 12 by a distance equal to the distance of focal length f of the concave reflecting surface 12, or at a distance of r/2 in this configuration, where r is the radius of the curvature of the sphere that is the concave reflecting surface 12. After passing through divergence control lens 22, focused beam 23 is directed via an opening in the concave reflecting surface 12 to a small angle steering element 24 located at the point u, which is located at a distance of 3r/2 from the reflecting surface 12 on the optical axis, where r is the radius of curvature of the sphere that is the concave reflecting surface 12. The small angle steering element 24 may be, but is not limited to, an electronically controllable small angle steered planar mirror controlled by piezoelectric controllers. The small angle steering element may also be, but is not limited to, an acousto-optical deflector, a micro-electro-mechanical systems (MEMS) micro-mirror, a Strontium Barium Niobate (SBN) electro-optical crystal or an opto-ceramic system, or any other suitable small angle beam steering device, preferably a reflective small angle steering device.

As with all embodiments of the invention, the invention illustrated in FIG. 3A is not limited to any particular small angle seeder or steering device. Essentially any small angle seeder or steering device as known to those skilled in the art may be used as small angle steering element 24 in this embodiment. One of ordinary skill in the art will realize that the invention disclosed within is not restricted to any specific small angle seeder or steering element or device, and that speed and performance of the invention can be adjusted by utilizing faster and more enhanced performance seeders or small angle steering elements at an increased cost. The utilization of various small angle seeders or steering elements in accordance with the invention disclosed in FIG. 3A and its various embodiments shall be readily known to those skilled in the art. As such, the present invention is not limited to the present small angle seeder or steering technology and as that technology develops in the future, it may readily be adapted to the present invention and its range amplification properties as demonstrated herein.

The small angle steering element 24 in FIG. 3A is positioned at a point that is a distance 3r/2 from the concave reflecting surface 12 along the optical axis, where r is the radius of curvature of the sphere that is the concave reflecting surface 12 and steers the beam 23 as reflected beams 14 and 15 to concave reflecting surface 12. For simplicity, only two beams representing the extremities of the steering range in one plane 11 (out of an infinite number of planes) are shown in FIG. 3A. At one end of the range, focused beam 23 is deflected from the small angle steering element 24 as beam 14 to the concave reflecting surface 12 from where it is reflected as final output beam 16. At the other end of the range, beam 23 is deflected from the small angle steering element 24 as beam 15 to concave reflecting surface 12, from where it is reflected as final output beam 17. Final reflected output beams 16 and 17, being extremes of beam steering in only one two-dimensional plane 11, out of an infinite number of planes rotating at the optical axis, are oriented 180° from each other with respect to the optical axis.

In the system of FIG. 3A, the divergence control lens 22 focuses beam 20 emitted by light source 18, now as focused beam 23, to surface 28, which coincides throughout its entire surface with surface 26. Again, surface 26 represents a surface passing through focal point f, is parallel to concave reflecting surface 12, and is separated from concave reflecting surface 12 by a distance equal to the focal length f of the concave reflecting surface. Because surfaces 26 and 28 coincide throughout, as demonstrated by the points that beams 14 and 15 pass through them, again represented by points f' and f" respectively, any beam originating from source 18 and passing through and being focused by lens 22 to surface 28 results in a collimated beam (e.g., final output beam 16), since surface 28 coincides throughout its entire surface with surface 26, i.e., both surfaces are identical. This means that beam 14 is focused at a point that is the distance equal to the focal length of the concave reflecting surface 12, that being surface 28, with the result that, within the approximations of paraxial rays, the reflected beam 16 is a collimated beam.

In FIG. 3A, as a result of the positioning of small angle steering element 24 at 3r/2 from concave reflecting surface 12 along the optical axis, the beams are reflected through a point that is 3r/4 from the sphere on the optical axis and the surfaces 26 and 28 coincide throughout. This means that within the paraxial ray approximation, all of the final output beams deflected by the system of FIG. 3A, wherein surface 28 and surface 26 coincide throughout, are collimated, irrespective of where a beam is directed from the small angle steering element 24 to concave reflecting steering surface 12, as long as the beam is focused to surface 28, which, in this configuration, coincides with surface 26.

Although the configuration illustrated in FIG. 3A results in a collimated beam steered at any angle by small angle steering element, as amplified thereafter by the concave reflecting surface 12, the system of FIG. 3A has a significant drawback in the amount of amplification of the range of the beam steering angle is fixed at 2. That is, the concave reflecting surface will only double the amplification of the steering range of the small-angle steering element 24.

Figure 4:
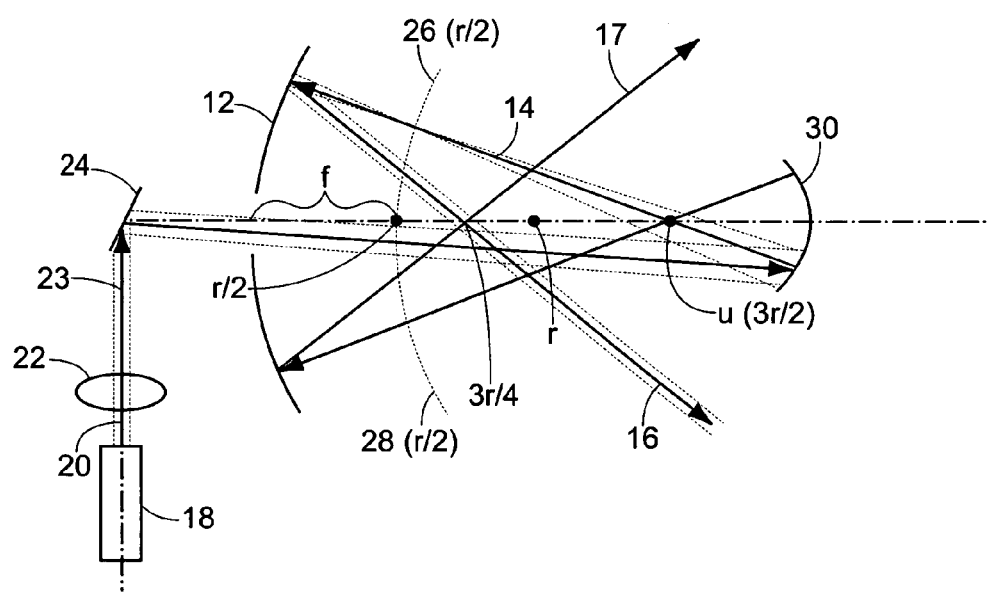
FIG. 4 is a schematic drawing showing a beam steering apparatus having two spherical mirrors and a well-collimated output beam.

FIG. 4 is a schematic drawing showing a beam steering apparatus having two spherical mirrors and a well-collimated output beam. In FIG. 4, there is a first concave reflecting surface 12 and a second concave reflecting surface 30.

Although the first concave reflecting surface 12 and the second concave reflecting surface 30 in the apparatus illustrated in FIG. 4 are spheres or are spherical in shape, it should be noted that this embodiment is not limited only to concave reflecting surfaces that are spheres or are spherical, but is meant to further include, without limitation, concave reflecting surfaces that are aspherical, cylindrical, paraboloidal, ellipsoidal, hyperboloidal, or any other suitable curved three-dimensional shape, with the appropriate modification(s) to an embodiment utilizing a non-spherical concave reflecting surface based on the particular focal properties and behavior of such non-spherical reflecting surface, as would be appreciated by one skilled in the art. However, as shown in the embodiment in FIG. 4, the first concave reflecting surface 12 and the second concave reflecting surface 30 are spherical reflectors, and the principles and methodology set forth regarding this embodiment are based on and calculated from the focusing properties of a concave spherical mirror for paraxial rays.

The beam steering apparatus of FIG. 4 includes a reasonably collimated light source 18 that emits a beam of light 20 such as, but not limited to, a laser light beam. In the system of FIG. 4, there is also a divergence control lens 22 that focuses the beam 20 emitted by light source 18, as focused beam 23, to surface 28, which, in this case, again coincides with surface 26 in its entirety, wherein surface 26 represents a surface passing through focal point f, is parallel to concave reflecting surface 12, and is separated from concave surface 12 by a distance equal to the distance of focal length f of the concave reflecting surface 12, or at a distance of r/2 in this configuration, where r is the radius of the curvature of the sphere that is the concave reflecting surface 12. After leaving the divergence control lens 22, the focused beam of light 23 is directed through an opening in the first concave reflecting surface 12 by small angle steering element 24 to a second concave reflecting surface 30, where it is reflected to first concave reflecting surface 12. Again, the small angle steering element 24 may be, but is not limited to, an electronically controllable small angle steered planar mirror controlled by piezoelectric controllers. The small angle steering element may also be, but is not limited to, an acousto-optical deflector, a micro-electro-mechanical systems (MEMS) micro-mirror, a Strontium Barium Niobate (SBN) electro-optical crystal or an opto-ceramic system, or any other suitable small angle beam steering device, preferably a reflective small angle steering device.

The invention illustrated in FIG. 4 is not limited to any particular small angle seeder or steering device. Essentially any small angle seeder or steering device as known to those skilled in the art may be used as small angle steering element 24 in this embodiment. One of ordinary skill in the art will realize that the invention disclosed within is not restricted to any specific small angle seeder or steering element or device, and that speed and performance of the invention can be adjusted by utilizing faster and more enhanced performance seeders or small angle steering elements at an increased cost. The utilization of various small angle seeders or steering elements in accordance with the invention disclosed in FIG. 4 and its various embodiments shall be readily known to those skilled in the art. As such, the present invention is not limited to the present small angle seeder or steering technology and as that technology develops in the future, it may readily be adapted to the present invention and its range amplification properties as demonstrated herein.

The second concave reflecting surface 30 in FIG. 4 is used to amplify the deflected beam from small angle steering element 24 to pass through the point u, which, in a preferred embodiment, is located at a distance 3r/2 from the first concave reflecting surface 12 along the optical axis. The power and position of the divergence control lens 22 is also selected so the beams 14 and 15, again representing extremes of the steering range in one plane, focus to surface 28. Because the beams pass through point u at 3r/2, surface 28 is coincident throughout with surface 26, which is parallel to concave reflecting surface 12 and focal distance f (or distance r/2 in this configuration) away from it. As such, surface 28 and surface 26 are coincident throughout, i.e., they are identical, and all of the final reflected output beams are collimated. Although FIG. 4 shows only two final reflected steered collimated beams 16 and 17, there are an infinite number of such final beams falling within the parameters of the beam steering apparatus of FIG. 4 under this configuration.

After reflecting from first concave reflecting surface 12, the final reflected output beams 16 and 17 both pass through a point at 3r/4 from the first concave reflecting surface 12 along the optical axis, and the surfaces 26 and 28 coincide throughout. This means that within the paraxial ray approximation, all of the final output beams deflected by the system of FIG. 4, wherein surface 28 and surface 26 coincide throughout, are collimated, irrespective of where a beam is directed from the small angle steering element 24 to concave reflecting steering surface 12, as long as the beam is focused to surface 28, which, in this configuration, coincides with surface 26. In this configuration, any beam properly focused to surface 28 (and, therefore, surface 26) by the device in FIG. 4 will result in a final reflected beam that is collimated and passes through point 3r/4, as is the case with final output beams 16 and 17.

The amplification of the range of beam steering of the small angle steering element 24 in FIG. 4 is the combination of the amplification by both concave reflecting surfaces, 12 and 30. Although the constraints for collimation of the final beams restrict the range amplification by the first reflecting surface 12 to a factor of 2, there is no such restriction on the amplification by the second concave reflecting surface 30. By choosing the position of the small angle steering element 24 and the second concave reflecting surface 30 with respect to the radius of curvature of concave reflecting surface 30, the range amplification of second concave reflecting surface 30 can readily be greater than 20. For instance, by making the range amplification of second concave reflecting surface 30 to be 15, the total range amplification of the system of FIG. 4 can be 30 so that a range of beam deflection of +/−1.5 degrees by the small angle steering element 24 can be amplified to a range of +/−45 degrees (30×+/−1.5 degrees =+/−45 degrees), while maintaining good collimation of the output beams.

Furthermore, one of ordinary skill in the art will appreciate that the constraints for collimation of the final beams that restrict the range amplification by the first reflecting surface 12 to a factor of 2 are only necessary for providing an essentially perfectly collimated beam at all angles of deflection. In practice, many useful systems may use output beams having some small range of divergence. Such systems may have a range amplification of first reflecting surface 12 that is significantly greater than 2 resulting in a slight degradation of the collimation of the output beam at various angles of deflection. This degradation of the collimation may, however, be within the tolerances and requirements of the overall system and may represent an adequate compromise in a choice of components. For instance, a system may trade off the cost savings and alignment simplicity of having only one concave reflecting surface and one flat reflecting surface and still achieve a required range amplification that is greater than 2 by relaxing the requirements on the collimation to be within the practical requirements of the particular application.

Figure 5:
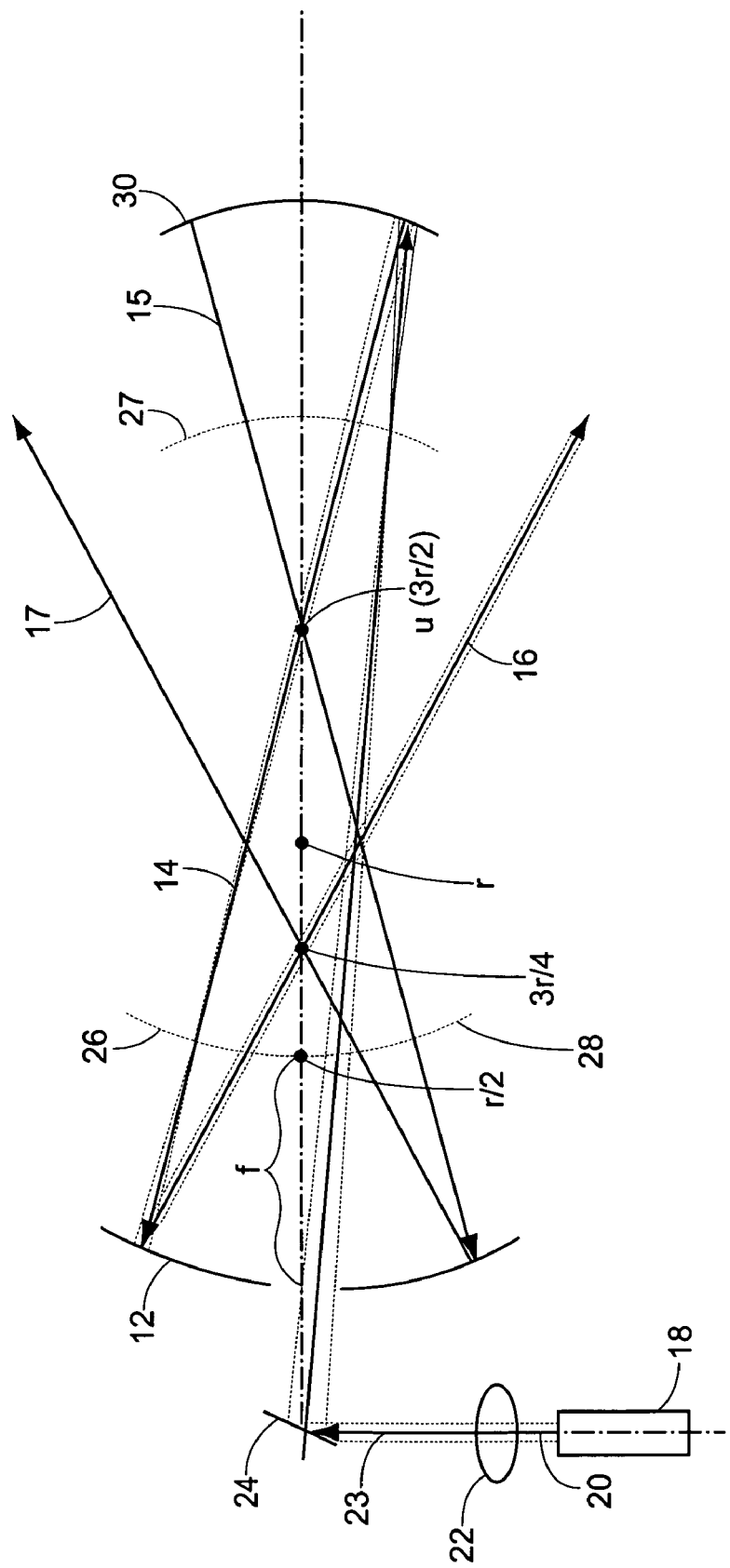
FIG. 5 is a schematic drawing showing a further embodiment of a beam steering apparatus having two spherical mirrors and a well-collimated output beam.

FIG. 5 is a schematic drawing showing a beam steering apparatus having two spherical mirrors and a well-collimated output beam. A major difference between the designs of FIG. 4 and FIG. 5 is the different power of divergence control lens 22.

In the design of FIG. 4, divergence control lens 22 and the second reflecting surface 30 are selected so that together they focus a beam of light from light source 18, as focused beam 23, on to surface 26, which is a focal length f away from the concave reflecting surface 12 in order to produce beam 16.

In the design of FIG. 5, however, divergence control lens 22 is selected to focus the beam from light source 18 to surface 27. Surface 27 is selected so that a paraxial ray focused here will then be focused to surface 26 by the second reflecting surface 30.

Although the first concave reflecting surface 12 and the second concave reflecting surface 30 in the apparatus illustrated in FIG. 5 are spheres or are spherical in shape, it should be noted that this embodiment is not limited only to a concave reflecting surface that is a sphere or is spherical, but is meant to further include, without limitation, concave reflecting surfaces that are aspherical, cylindrical, paraboloidal, ellipsoidal, hyperboloidal, or any other suitable curved three-dimensional shape, with the appropriate modification(s) to an embodiment utilizing a non-spherical concave reflecting surface based on the particular focal properties and behavior of such non-spherical reflecting surface, as would be appreciated by one skilled in the art. However, as shown in the embodiment in FIG. 5, the first concave reflecting surface 12 and the second concave reflecting surface 30 are spherical reflectors, and the principles and methodology set forth regarding this embodiment are based on and calculated from the focusing properties of a concave spherical mirror for paraxial rays.

The beam steering apparatus of FIG. 5 includes a reasonably collimated light source 18 that emits a beam of light 20 such as, but not limited to, a laser light beam. In the system of FIG. 5, there is also a divergence control lens 22 that focuses the beam 20 emitted by light source 18, as beam 23, to surface 27, said surface of which is selected so that a paraxial ray focused here will be focused to surface 26. That is, with this configuration, a beam focused to surface 27 will, in turn, focus to surface 26. After leaving the divergence control lens 22, the focused beam 23 is directed through an opening in the first concave reflecting surface 12 by small angle steering element 24 to second concave reflecting surface 30, all the while being focused on said surface 27, which is parallel to second concave reflecting surface 30 and at a position such that the paraxial beam focused here will be focused to surface 26 by the second reflecting surface 30. Surface 26 represents a surface passing through focal point f, is parallel to concave reflecting surface 12, and is separated from concave surface 12 by a distance equal to the distance of focal length f of the concave reflecting surface 12, or at a distance of r/2 within this configuration, where r is the radius of the curvature of the sphere that is the concave reflecting surface 12. After reflecting from second concave reflecting surface 30, the reflected beam 14 is directed towards first concave reflecting surface 12, all the while being focused on surface 26.

As with prior embodiments, the small angle steering element 24 may be, but is not limited to, an electronically controllable small angle steered planar mirror controlled by piezoelectric controllers. The small angle steering element may also be, but is not limited to, an acousto-optical deflector, a micro-electro-mechanical systems (MEMS) micro-mirror, a Strontium Barium Niobate (SBN) electro-optical crystal or an opto-ceramic system, or any other suitable small angle beam steering device, preferably a reflective small angle steering device. The invention illustrated in FIG. 5 is not limited to any particular small angle seeder or steering device. Essentially any small angle seeder or steering device as known to those skilled in the art may be used as small angle steering element 24 in this embodiment. One of ordinary skill in the art will realize that the invention disclosed within is not restricted to any specific small angle seeder or steering element or device, and that speed and performance of the invention can be adjusted by utilizing faster and more enhanced performance seeders or small angle steering elements at an increased cost. The utilization of various small angle seeders or steering elements in accordance with the invention disclosed in FIG. 5 and its various embodiments shall be readily known to those skilled in the art. As such, the present invention is not limited to the present small angle seeder or steering technology and as that technology develops in the future, it may readily be adapted to the present invention and its range amplification properties as demonstrated herein.

The second concave reflecting surface 30 in FIG. 5 is used to amplify the deflected beam from small angle steering element 24 to pass through the point u, which, in a preferred embodiment, is located at a distance 3r/2 from the first concave reflecting surface 12 along the optical axis. The power and position of the divergence control lens 22 is selected so focused beam 23 focuses first to surface 27, which, in turn, causes beams 14 and 15, again representing extremes of the steering range in one plane out of an infinite number of such planes rotating about the optical axis, reflecting from second concave reflecting surface 30 to be focused on surface 26. Because the beams pass through point u at 3r/2, as with prior embodiments, surface 28 is therefore coincident throughout with surface 26, said surface 26 being parallel to concave reflecting surface 12 and located at a distance from it equal to the distance of focal length f of the concave reflecting surface 12, or a distance of r/2 within this configuration, where r is the radius of the curvature of the sphere that is the concave reflecting surface 12. As a result, all reflected final output beams steered off of first concave reflecting surface 12 are collimated. Although FIG. 5 shows only two final reflected steered collimated beams 16 and 17, there are an infinite number of such final output beams falling within the parameters of the beam steering apparatus of FIG. 5 as it is configured.

After reflecting from first concave reflecting surface 12, final output reflected beams 16 and 17 both pass through a point at a distance 3r/4 from the first concave reflecting surface 12 along the optical axis, where r is the radius of the curvature of the sphere that is the concave reflecting surface 12. This means that within the paraxial ray approximation, all of the final output beams deflected by the system of FIG. 5, wherein surface 28 and surface 26 coincide throughout, are collimated, irrespective of where a beam is directed from the small angle steering element 24 to concave reflecting steering surface 12, as long as the beam is focused to surface 28, which, in this configuration, coincides with surface 26. In this configuration, any beam properly focused to surface 28 (and, therefore, surface 26) by the device in FIG. 5 will result in a beam properly focused to surface 27 by the apparatus, resulting in a final reflected beam that is collimated and passes through point 3r/4, as is the case with final output beams 16 and 17. Within this configuration, any beam properly focused to surface 27 by the apparatus will result in a final reflected output beam that is collimated and passes through point 3r/4, e.g., beams 16 and 17.

The amplification of the range of beam steering of the small angle steering element 24 in FIG. 5 is the combination of the amplification by both concave reflecting surfaces, 12 and 30. As with prior embodiments, although the constraints for collimation of the final beams restrict the range amplification by the first reflecting surface 12 to a factor of 2, there is no such restriction on the amplification by the second concave reflecting surface 30. By choosing the position of the small angle steering element 24 and the second concave reflecting surface 30 with respect to the radius of curvature of concave reflecting surface 30, the range amplification of second concave reflecting surface 30 can readily be greater than 20. For instance, by making the range amplification of second concave reflecting surface 30 to be 15, the total range amplification of the system of FIG. 5 can be 30, so that a range of beam deflection of +/−1.5 degrees by the small angle steering element 24 can be amplified to a range of +/−45 degrees (30×+/−1.5 degrees =+/45 degrees), while maintaining good collimation of the output beams.

Furthermore, one of ordinary skill in the art will appreciate that the constraints for collimation of the final beams that restrict the range amplification by the first reflecting surface 12 to a factor of 2 are only necessary for providing an essentially perfectly collimated beam at all angles of deflection. In practice, many useful systems may use output beams having some small range of divergence. Such systems may have a range amplification of first reflecting surface 12 that is significantly greater than 2 resulting in a slight degradation of the collimation of the output beam at various angles of deflection. This degradation of the collimation may, however, be within the tolerances and requirements of the overall system and may represent an adequate compromise in a choice of components. For instance, a system may trade off the cost savings and alignment simplicity of having only one concave reflecting surface and one flat reflecting surface and still achieve a required range amplification that is greater than 2 by relaxing the requirements on the collimation to be within the practical requirements of the particular application.

Figure 5A:
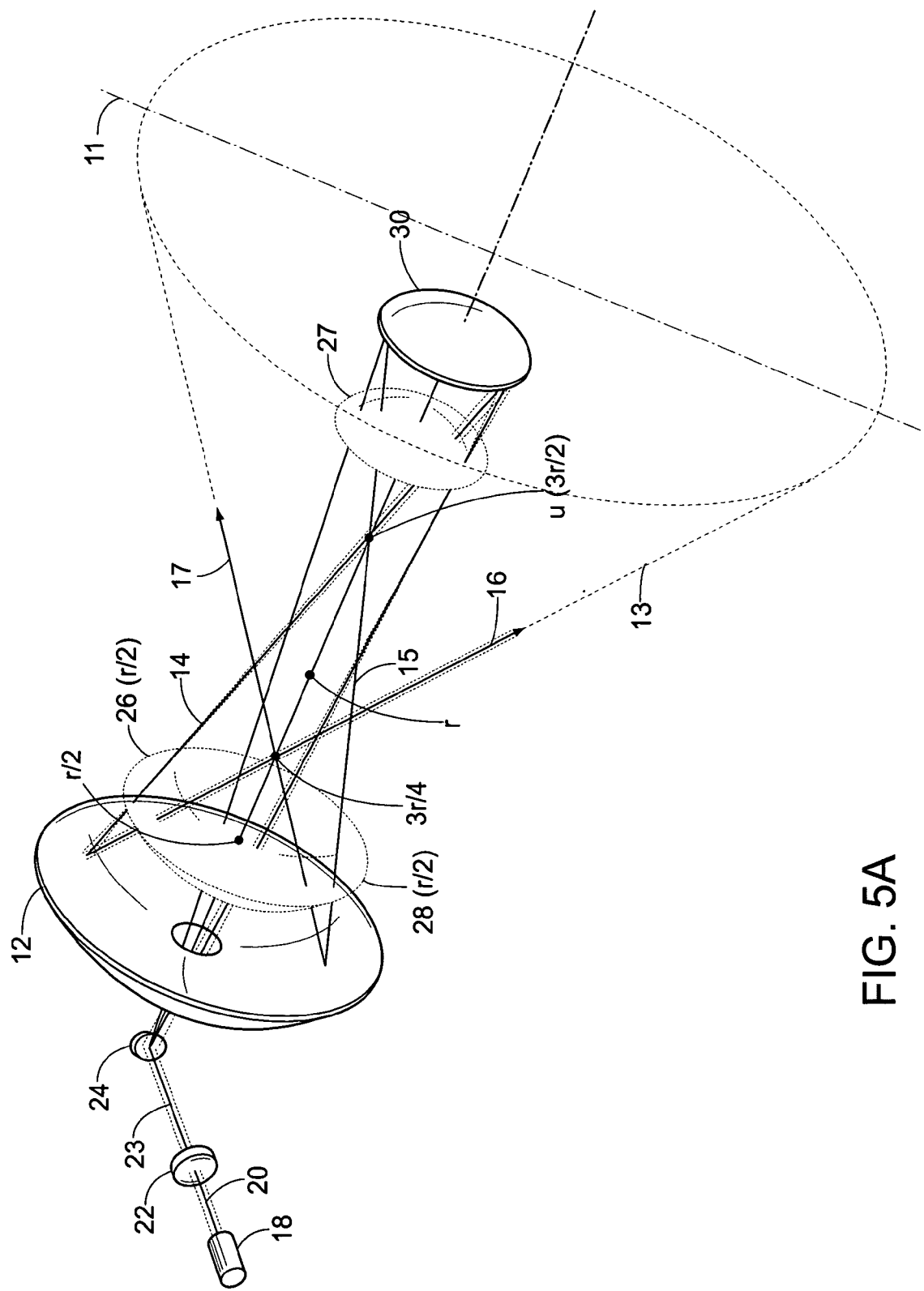
FIG. 5A is a drawing of a perspective view of the invention illustrated in FIG. 5, showing a further embodiment of a beam steering apparatus having two spherical mirrors and a well-collimated output beam.

FIG. 5A is a drawing of perspective view of the invention illustrated in FIG. 5, showing a further embodiment of a beam steering apparatus having two spherical mirrors and a well-collimated output beam.

Although the first concave reflecting surface 12 and the second concave reflecting surface 30 in the apparatus illustrated in FIG. 5A are spheres or are spherical in shape, it should be noted that this embodiment is not limited only to a concave reflecting surface that is a sphere or is spherical, but is meant to further include, without limitation, concave reflecting surfaces that are aspherical, cylindrical, paraboloidal, ellipsoidal, hyperboloidal, or any other suitable curved three-dimensional shape, with the appropriate modification(s) to an embodiment utilizing a non-spherical concave reflecting surface based on the particular focal properties and behavior of such non-spherical reflecting surface, as would be appreciated by one skilled in the art. However, as shown in the embodiment in FIG. 5A, the first concave reflecting surface 12 and the second concave reflecting surface 30 are spherical reflectors, and the principles and methodology set forth regarding this embodiment are based on and calculated from the focusing properties of a concave spherical mirror for paraxial rays.

As with FIG. 5, in the design of FIG. 5A, divergence control lens 22 is selected to focus a beam from light source 18, such as a laser beam light source, as focused beam 23, to surface 27. Surface 27 is selected so that a paraxial ray focused here will be focused to surface 26 by the second reflecting surface 30.

The beam steering apparatus of FIG. 5A includes a reasonably collimated light source 18 that emits a beam of light 20 such as, but not limited to, a laser light beam. In the system of FIG. 5A, there is also a divergence control lens 22 that focuses the beam 20 emitted by light source 18, as beam 23, to surface 27, said surface of which is selected so that a paraxial ray focused here will be focused to surface 26 by the second reflecting surface 30. Surface 26, again, is parallel to concave reflecting surface 12 and located a distance of f, or, in this configuration, the distance r/2, from reflecting surface 12. After passing through divergence control lens 22, the focused beam of light 23 is directed by small angle steering element 24 through an opening in the first concave reflecting surface 12 to second concave reflecting surface 30, all the while being focused on said surface 27, of which said surface 27 is parallel to second concave reflecting surface 30 and at a position such that the paraxial beam focused at surface 27 will be focused to surface 26 by second reflecting surface 30. After reflecting from second concave reflecting surface 30, the reflected beam 14 is directed towards first concave reflecting surface 12, all the while being focused on surface 26.

As with prior embodiments, the small angle steering element 24 in FIG. 5A may be, but is not limited to, an electronically controllable small angle steered planar mirror controlled by piezoelectric controllers. The small angle steering element may also be, but is not limited to, an acousto-optical deflector, a micro-electro-mechanical systems (MEMS) micro-mirror, a Strontium Barium Niobate (SBN) electro-optical crystal or an opto-ceramic system, or any other suitable small angle beam steering device, preferably a reflective small angle steering device. The invention illustrated in FIG. 5A is not limited to any particular small angle seeder or steering device. Essentially any small angle seeder or steering device as known to those skilled in the art may be used as small angle steering element 24 in this embodiment. One of ordinary skill in the art will realize that the invention disclosed in FIG. 5A is not restricted to any specific small angle seeder or steering element or device, and that speed and performance of the invention can be adjusted by utilizing faster and more enhanced performance seeders or small angle steering elements at an increased cost. The utilization of various small angle seeders or steering elements in accordance with the invention disclosed in FIG. 5A and its various embodiments shall be readily known to those skilled in the art. As such, the present invention is not limited to the present small angle seeder or steering technology and as that technology develops in the future, it may readily be adapted to the present invention and its range amplification properties as demonstrated herein.

The second concave reflecting surface 30 in FIG. 5A is used to amplify the deflected beam from small angle steering element 24 to pass through the point u, which, in a preferred embodiment, is located at a distance 3r/2 from the first concave reflecting surface 12 along the optical axis. The power and position of the divergence control lens 22 is selected so focused beam 23 focuses first to surface 27, which, in turn, causes beams 14 and 15, again representing extremes of the steering range in one two-dimensional plane 11 (out of an infinite number of such planes rotating about the optical axis) reflecting from second concave reflecting surface 30 to be focused on surface 26. Because the beams pass through point u at 3r/2, as with prior embodiments, surface 28 is therefore coincident with surface 26, wherein surface 26 represents a surface passing through focal point f, is parallel to concave reflecting surface 12, and is separated from concave surface 12 by a distance equal to the distance of focal length f of the concave reflecting surface 12, or at a distance of r/2 in this configuration, where r is the radius of the curvature of the sphere that is the concave reflecting surface 12. As a result, all final reflected output beams steered from first concave reflecting surface 12 are collimated. Although FIG. 5A shows only two final reflected steered collimated beams 16 and 17, there are an infinite number of such final output beams falling within the parameters of the beam steering apparatus of FIG. 5A.

After reflecting from first concave reflecting surface 12, final reflected output beams 16 and 17 both pass through a point at a distance of 3r/4 from the first concave reflecting surface 12 along the optical axis, where r is the radius of the curvature of the sphere that is the concave reflecting surface 12. This means that within the paraxial ray approximation, all of the final output beams deflected by the system of FIG. 5A, wherein surface 28 and surface 26 coincide throughout, are collimated, irrespective of where a beam is directed from the small angle steering element 24 to concave reflecting steering surface 12, as long as the beam is focused to surface 28, which, in this configuration, coincides with surface 26. In this configuration, any beam properly focused to surface 28 (and, therefore, surface 26) by the device in FIG. 5A will result in a beam properly focused to surface 27 by the apparatus, resulting in a final reflected beam that is collimated and passes through point 3r/4, as is the case with final output beams 16 and 17. Within this configuration, any beam properly focused to surface 27 by the apparatus will result in a final reflected output beam that is collimated and passes through point 3r/4, e.g., beams 16 and 17.

As with FIG. 5, the amplification of the range of beam steering of the small angle steering element 24 in FIG. 5A is the combination of the amplification by both concave reflecting surfaces, 12 and 30. As with prior embodiments, although the constraints for perfect collimation of the final beams restrict the range amplification by the first reflecting surface 12 to a factor of 2, there is no such restriction on the amplification by the second concave reflecting surface 30. By choosing the position of the small angle steering element 24 and the second concave reflecting surface 30 with respect to the radius of curvature of concave reflecting surface 30, the range amplification of second concave reflecting surface 30 can readily be greater than 20. For instance, by making the range amplification of second concave reflecting surface 30 to be 15, the total range amplification of the system of FIG. 5A can be 30 so that a range of beam deflection of +/−1.5 degrees by the small angle steering element 24 can be amplified to a range of +/−45 degrees (30×+/−1.5 degrees =+/−45 degrees), while maintaining good collimation of the output beams.

Furthermore, one of ordinary skill in the art will appreciate that the constraints for collimation of the final beams that restrict the range amplification by the first reflecting surface 12 to a factor of 2 are only necessary for providing an essentially perfectly collimated beam at all angles of deflection. In practice, many useful systems may use output beams having some small range of divergence. Such systems may have a range amplification of first reflecting surface 12 that is significantly greater than 2 resulting in a slight degradation of the collimation of the output beam at various angles of deflection. This degradation of the collimation may, however, be within the tolerances and requirements of the overall system and may represent an adequate compromise in a choice of components. For instance, a system may trade off the cost savings and alignment simplicity of having only one concave reflecting surface and one flat reflecting surface and still achieve a required range amplification that is greater than 2 by relaxing the requirements on the collimation to be within the practical requirements of the particular application.

The systems of FIG. 4, FIG. 5 and FIG. 5A all have the drawback that the second concave reflecting surface 30 obstructs a significant fraction of the output beams.

Figure 5B:
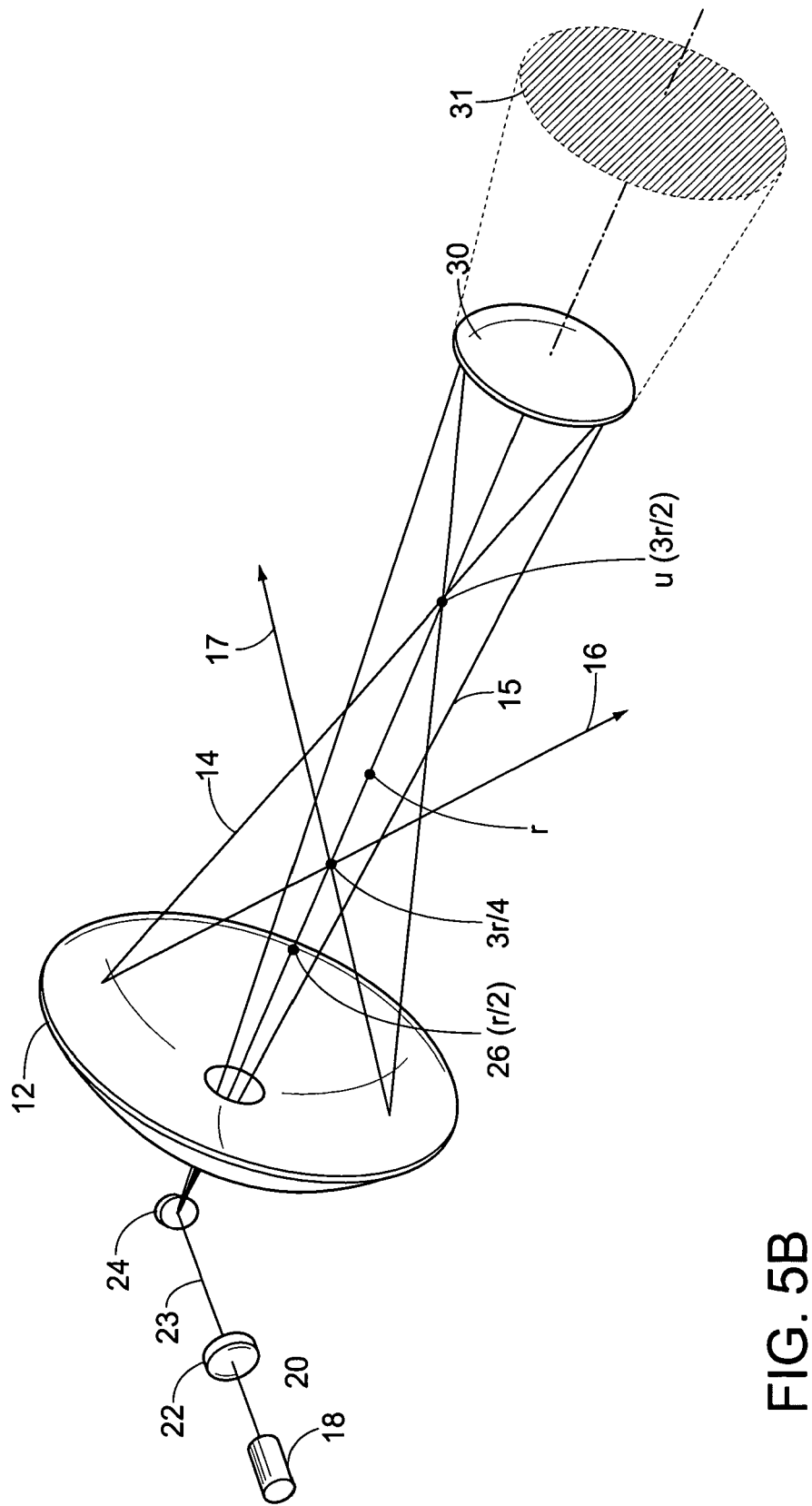
FIG. 5B is drawing of a further perspective view of the invention illustrated in FIG. 5, showing a further embodiment of a beam steering apparatus having two spherical mirrors and a well-collimated output beam.

FIG. 5B is a further perspective drawing of the invention illustrated in FIG. 5 and FIG. 5A, but illustrates the obstruction of the output path field 31 caused by the second concave reflecting surface 30. Final output beams reflecting from first concave reflecting surface 12 may, depending on the final output steering angle, be directed back at second concave reflecting surface 30, thereby disrupting said beams' intended steered final output path. FIG. 5B demonstrates that obstructed output path field 31.

Figure 6:
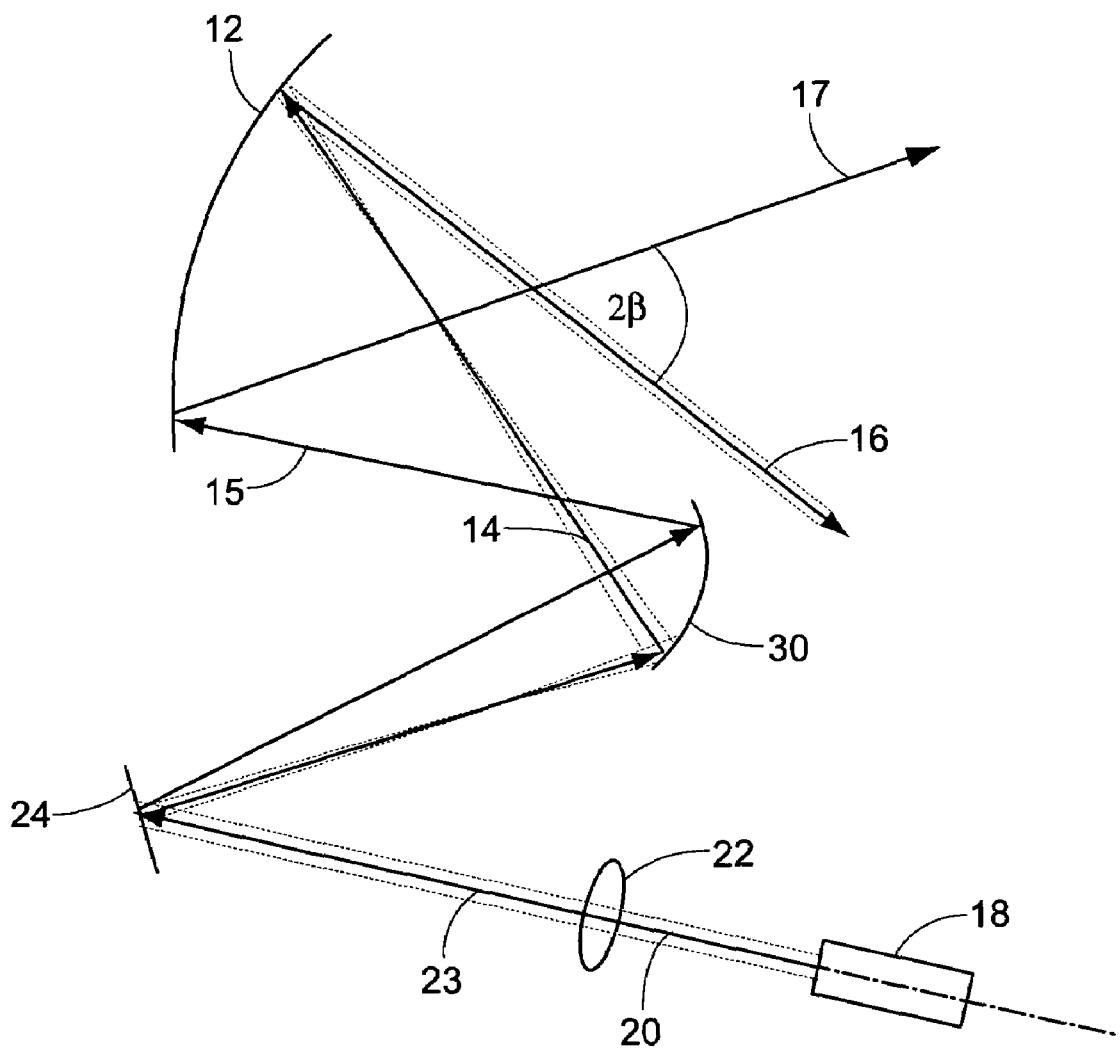
FIG. 6 is a schematic drawing showing a beam steering apparatus having two off-axis spherical mirrors and a reasonably collimated output beam.

FIG. 6 is a schematic drawing of a preferred embodiment of the invention and shows a beam steering apparatus having two off-axis spherical mirrors and a reasonably collimated output beam. By moving the reasonably collimated light source 18, divergence control lens 22, small angle steering element 24, second concave reflecting surface 30 and first concave reflecting surface 12 (as all are previously shown in FIG. 5, FIG. 5A and FIG. 5B) to no longer be on a single optical axis, an off-axis system as illustrated can be constructed in which the final output cone of deflected beams having extremes represented by beams 17 and 16 is unobstructed by any optical elements of the system, such as by second concave reflecting surface 30 as shown in FIG. 5B. As such, the obstruction caused by the embodiments depicted in FIG. 5, FIG. 5A and FIG. 5B is eliminated.

Prior embodiments of the invention as disclosed herein employed configurations on a single optical axis and concave reflective surfaces that were spherical, and thus, paraxial ray values could be applied to the positioning of the embodiments without the need for optimization efforts, whether by computer software programs or otherwise, as are generally known to those skilled in the art. In the prior embodiments, the concave reflecting surfaces utilized were spherical reflectors, and the principles and methodology set forth regarding those embodiments were based on and calculated from the focusing properties of a concave spherical mirror for paraxial rays. In the embodiment of the invention illustrated in FIG. 6 and in the embodiments in the drawings that follow, an off-axis configuration of the invention is disclosed. Although concave reflecting surfaces that are a sphere or spherical in shape may be used and paraxial ray values applied as a starting point for positioning and curvatures, the embodiment of FIG. 6 and further off-axis embodiments that follow may require certain optimization, which can be provided by raytrace programs such as the TracePro™ program supplied by Lambda Research, Inc. of Littleton, Mass. As described in greater detail below, the optimizing raytrace programs can systematically adjust properties of the components of a system or embodiment, including, but not limited to, such properties as focal power, focusing properties, curvature, relative spacing, relative positioning and orientation, among other properties, while monitoring the effect on the parameters to be optimized through raytracing. In addition, using optimization techniques well known to those skilled in the art, concave reflecting surfaces that are aspherical may be desired in off-axis configurations. Designing optical systems in such a manner is well-known and widely practiced by those skilled in the art, who will appreciate the likely requirement to optimize off-axis embodiments of the invention. As such, in a further embodiment of the system of FIG. 6, the two off-axis concave mirrors may be aspheric surfaces selected by such ray-trace optimization programs to minimize or otherwise control the divergence of the output beam.

The beam steering apparatus of FIG. 6 includes a reasonably collimated light source 18 that emits a beam of light 20 such as, but not limited to, a laser light beam. In the system of FIG. 6, there is also a divergence control lens 22. After leaving the divergence control lens 22, the focused beam of light 23 is reflected by a small angle steering element 24 towards the second concave reflecting surface 30. After reflecting from second concave reflecting surface 30, the reflected beam 14 is directed towards first concave reflecting surface 12.

As with prior embodiments and employing the same methodology, the second concave reflecting surface 30 in FIG. 6 is used to amplify the deflected beam from small angle steering element 24. The power and position of the divergence control lens 22 is selected so that the focused beam 23 is first steered by small angle steering element 24 towards second concave reflecting surface 30 and so that reflected beams 14 and 15, again representing extremities of the steering range in one plane, are steered towards first concave reflecting surface 12.

The second concave reflecting surface 30 in FIG. 6 is used to amplify the deflected beam from small angle steering element 24. The power and position of the divergence control lens 22 is selected, or as may be determined through optimization, so that focused beam 23 focuses first to a surface (not shown in FIG. 6) in front of second concave reflecting surface 30 that minimizes the divergence of the final beam, which, in turn, causes beams 14 and 15, again representing extremes of the steering angle in one two-dimensional plane (out of an infinite number of planes) reflecting from second concave reflecting surface 30 to be focused to a second surface (not shown in FIG. 6) in front of first concave reflecting surface 12 that, again, minimizes the divergence of the final beam. In prior embodiments configured on a single optical axis, such as that depicted in FIGS. 5, 5A and 5B, said surfaces (represented by surfaces 26, 28 and 27 in those illustrations) are readily determined by applying paraxial ray values. The starting point of said surfaces in front of second concave reflecting surface 30 and in front of first concave reflecting surface 12 in an off-axis beam steering apparatus such as that illustrated in FIG. 6 may be based on an understanding of the systems discussed above using paraxial ray values as a starting point for positioning and curvatures. However, as a result of optimization, the resultant optimized, off-axis beam steering system may have spacings and curvatures that are different from those predicted by the paraxial ray equations while operating with the same general principles enunciated above. Designing optical systems in such a manner is well-known and widely practiced by those skilled in the art, who will appreciate the likely requirement to optimize off-axis embodiments of the invention.

As in prior embodiments, in the invention illustrated in FIG. 6, first concave reflecting surface 12 further amplifies the steering range or angle of beams 14 and 15, resulting in final output beams 16 and 17, which represent extremes of the final output steering range in one two-dimensional plane (out of an infinite number of such planes). As a result, all final reflected output beams steered from first concave reflecting surface 12 are reasonably to well collimated, based on the nature, level and extent of the optimization employed. Although FIG. 6 shows only two final steered collimated beams 16 and 17, there are an infinite number of such final output beams falling within the parameters of the beam steering apparatus of FIG. 6.

In addition, even in a reasonably optimized off-axis configuration, it may not always be possible to achieve a well collimated final output beam, with virtually no divergence throughout the entire output field of regard. Nonetheless, any degradation of the collimation may be within the tolerances and requirements of the overall system and may represent an adequate compromise.

As such, the invention depicted in FIG. 6, as an optimized system, exhibits a good degree of collimation over a range of beam deflection in a demonstrated field of regard of at least +/−45 degrees with no obstruction.

Figure 6A:
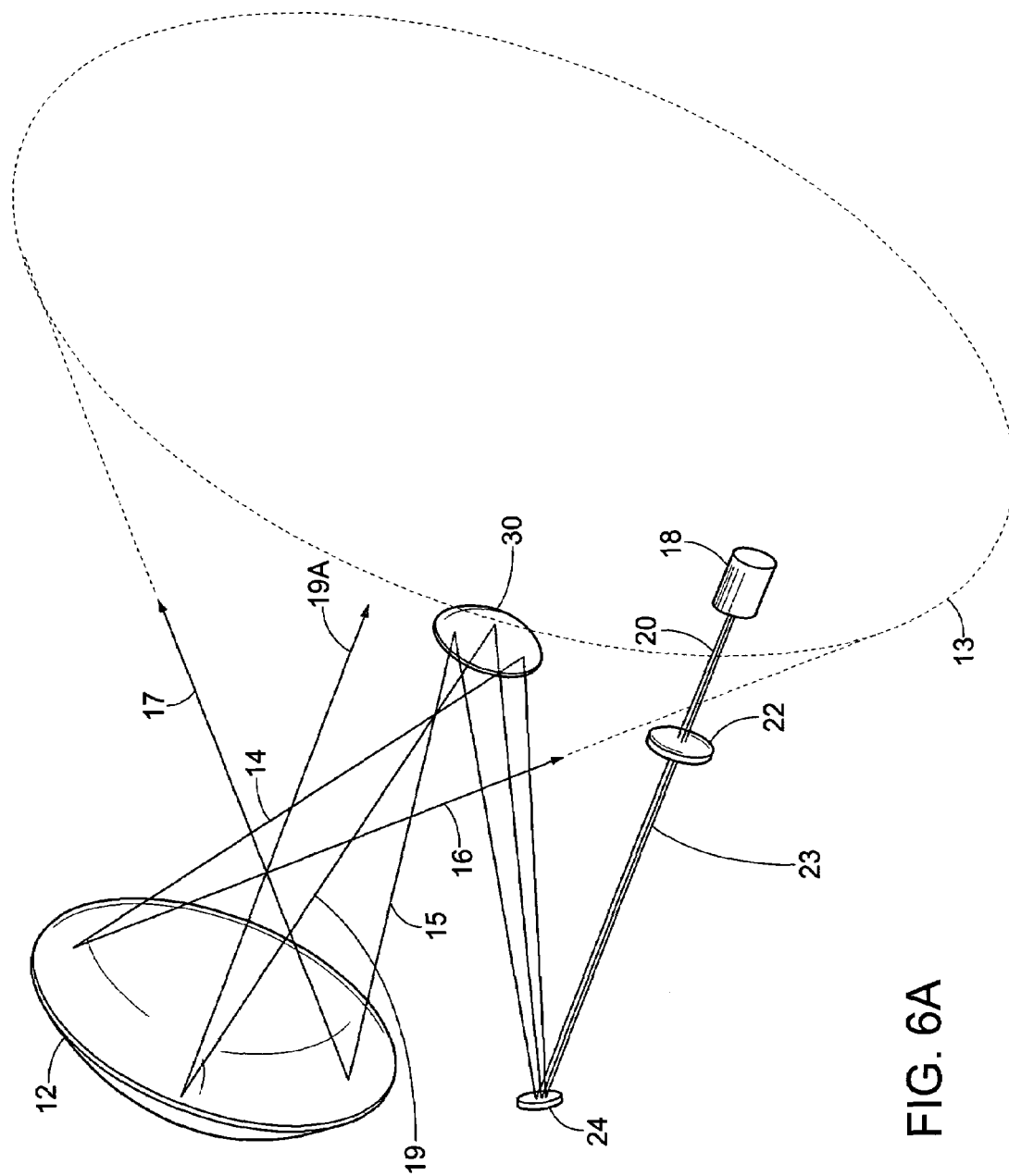
FIG. 6A is drawing of a perspective view of the invention illustrated in FIG. 6, showing a beam steering apparatus having two off-axis spherical mirrors and a reasonably collimated output beam.

FIG. 6A is a drawing of a perspective view of the invention illustrated in FIG. 6, showing a beam steering apparatus having two off-axis spherical mirrors and a reasonably collimated output beam.

Again, using paraxial ray values as a starting point for positioning and curvatures, the system of FIG. 6A, and all off-axis embodiments of the invention, may be optimized by raytrace software programs that are widely known to those skilled in the art. Designing optical systems in such a manner is well-known and widely practiced. The number, type and position of the optical components may, for instance, be selected using an understanding of the desired optical system that is grounded in paraxial ray approximation of the components' capabilities. The selected components and their relative position and orientation may then be specified to the optimizing ray trace program, as well as one or more parameters for which the system performance is desired to be optimized. The optimizing raytrace program then systematically adjusts properties of the components of the system, including, but not limited to, such factors as focal power, focusing properties, curvature, relative spacing, and relative positioning and orientation, among other properties, while monitoring the effect on the parameters to be optimized through raytracing. The starting point of an off-axis beam steering apparatus may, for instance, be based on an understanding of the systems discussed above. The parameters to be optimized may be selected as the collimation of the output beams at one or more specified directions or ranges. As a result, the resultant optimized, off-axis beam steering system may have spacings and curvatures that are different from those predicted by the paraxial ray equations while operating with the same general principles enunciated above. Such an optimized system may exhibit a good degree of collimation over a required range of beam deflection with no obstruction. In a further embodiment of the system of FIG. 6A, the two off-axis concave mirrors may be aspheric surfaces selected by using such ray-trace optimization programs to minimize or otherwise control the divergence of the output beam.

In the embodiment illustrated in FIG. 6A, by moving the reasonably collimated light source 18, divergence control lens 22, small angle steering element 24, second concave reflecting surface 30 and first concave reflecting surface 12 (as all are previously shown in FIG. 5, FIG. 5A and FIG. 5B) to no longer be on a single optical axis, an off axis system as illustrated can be constructed in which the output cone or field of regard of final output beams having extremes represented by final output beams 17 and 16 is unobstructed by any optical elements of the system, such as by second concave reflecting surface 30 as shown in FIG. 5B. As such, the obstruction caused by the embodiments depicted in FIG. 5, FIG. 5A and FIG. 5B, is eliminated.

The beam steering apparatus of FIG. 6A includes a reasonably collimated light source 18 that emits a beam of light 20 such as, but not limited to, a laser light beam. In the system of FIG. 6A, there is also a divergence control lens 22. After leaving the divergence control lens 22, the focused beam of light 23 is reflected by a small angle steering element 24 towards the second concave reflecting surface 30. After reflecting from second concave reflecting surface 30, the reflected beam 14 is directed towards first concave reflecting surface 12.

As with prior embodiments and employing the same methodology described herein, the second concave reflecting surface 30 in FIG. 6A is used to amplify the deflected beam from small angle steering element 24. The power and position of the divergence control lens 22 is selected so that the focused beam 23 is first steered by small angle steering element 24 towards second concave reflecting surface 30 and so that beams 14 and 15, again representing extremes of the steering range in one two-dimensional plane, and in this drawing a third beam 19, third beam 19 being outside of the two dimensional plane formed by beams 14 and 15 and being a representative random beam from the infinite number of beams that could be reflected from second concave reflecting surface 30 under this configuration, are steered from second concave reflecting surface 30 towards first concave reflecting surface 12.

The second concave reflecting surface 30 in FIG. 6A is used to amplify the deflected beam from small angle steering element 24. The power and position of the divergence control lens 22 is selected, or as may be determined through optimization, so that focused beam 23 focuses first to a surface (not shown in FIG. 6A) in front of second concave reflecting surface 30 that minimizes the divergence of the final beam, which, in turn, causes beams 14 and 15, again representing extremes of the steering angle in one two-dimensional plane (out of an infinite number of planes), and third random beam 19, reflecting from second concave reflecting surface 30 to be focused to a second surface (not shown in FIG. 6A) in front of first concave reflecting surface 12 that, again, minimizes the divergence of the final output beam. In prior embodiments configured on a single optical axis, such as that depicted in FIGS. 5, 5A and 5B, said surfaces (represented by surfaces 26, 28 and 27 in those illustrations) are readily determined by applying paraxial ray values. In the off-axis system of FIG. 6A, the starting point of said surfaces in front of second concave reflecting surface 30 and in front of first concave reflecting surface 12 may be based on an understanding of the systems discussed above using paraxial ray values as a starting point for positioning and curvatures. However, as a result of optimization, the resultant optimized, off-axis beam steering system may have spacings and curvatures that are different from those predicted by the paraxial ray equations while operating with the same general principles enunciated above.

As in prior embodiments, in the invention illustrated in FIG. 6A, first concave reflecting surface 12 further amplifies the steering range or angle of beams 14, and 19, respectively resulting in final output beams 16 and 17, which represents extremes of the final output steering range in one two-dimensional plane (out of an infinite number of such planes) and final output beam 19A, a random final output beam outside of the two-dimensional plane formed by final output beams 16 and 17. As a result, all final reflected output beams steered from first concave reflecting surface 12 are reasonably to well collimated, based on the nature, level and extent of the optimization employed. Although FIG. 6A shows only three final steered reasonably-collimated beams 16, 17 and 19A, there are an infinite number of such final output beams falling within the parameters of the beam steering apparatus of FIG. 6A.

In addition, even in a reasonably optimized off-axis configuration, it may not always be possible to achieve a well collimated final output beam with virtually no divergence throughout the entire output field of regard. Nonetheless, any degradation of the collimation may be within the tolerances and requirements of the overall system and may represent an adequate compromise.

As such, the invention depicted in FIG. 6A, as an optimized system, exhibits a good degree of collimation over a range of beam deflection in a demonstrated field of regard of at least +/−45 degrees with no obstruction.

Figure 6B:
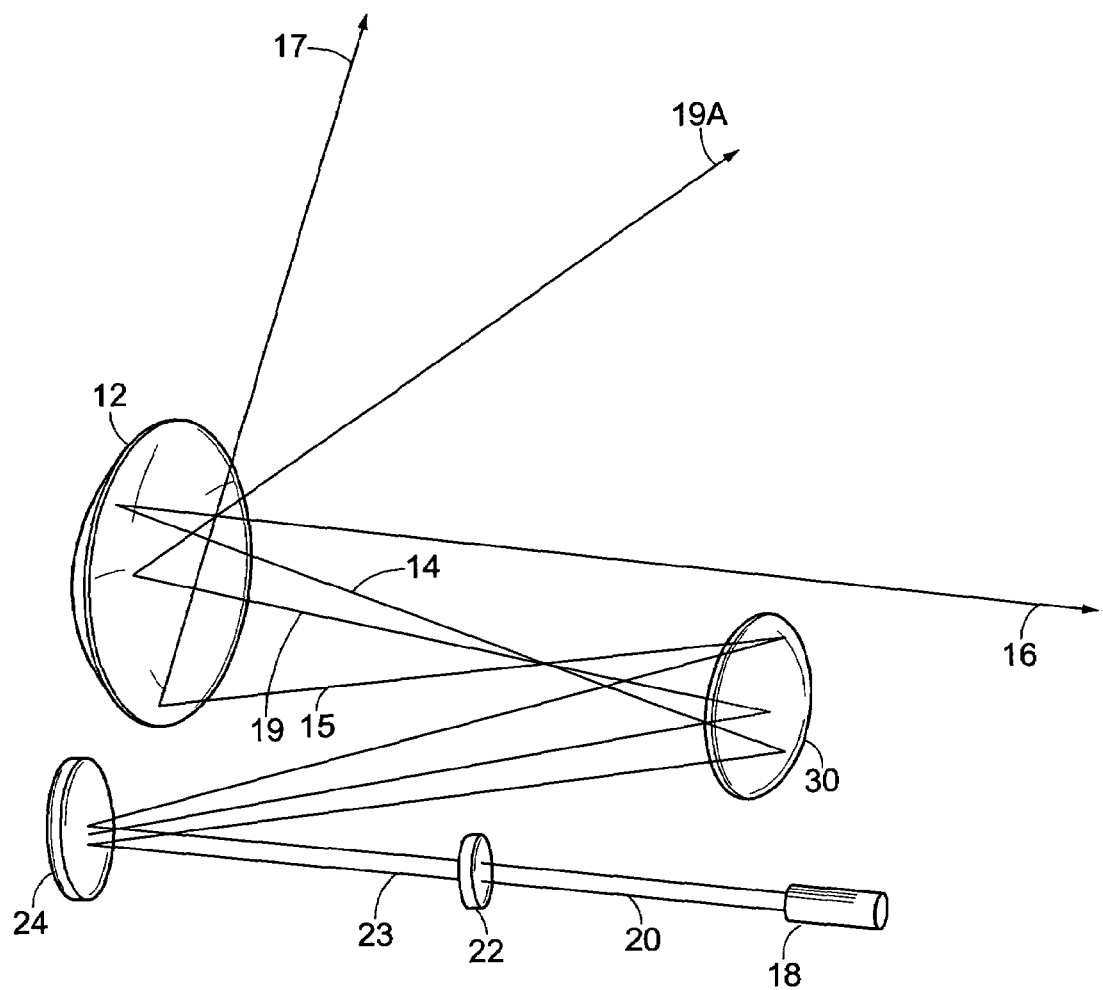
FIG. 6B is a drawing of a further perspective view of the invention illustrated in FIG. 6, showing a beam steering apparatus having two off-axis spherical mirrors and a reasonably collimated output beam.

FIG. 6B is a drawing of a further perspective view of the invention illustrated in FIG. 6 and FIG. 6A, showing a beam steering apparatus having two off-axis spherical mirrors and a reasonably collimated output beam. The depiction of the invention in FIG. 6B is from a different perspective view, yet demonstrating all of the above described principles and methodology.

As with prior embodiments, the small angle steering element 24 in FIG. 6, FIG. 6A and FIG. 6B may be, but is not limited to, an electronically controllable small angle steered planar mirror controlled by piezoelectric controllers. The small angle steering element may also be, but is not limited to, an acousto-optical deflector, a micro-electro-mechanical systems (MEMS) micro-mirror, a Strontium Barium Niobate (SBN) electro-optical crystal or an opto-ceramic system, or any other suitable small angle beam steering device, preferably a reflective small angle steering device. The invention illustrated in FIG. 6, FIG. 6A and FIG. 6B is not limited to any particular small angle seeder or steering device. Essentially any small angle seeder or steering device as known to those skilled in the art may be used as small angle steering element 24 in this embodiment. One of ordinary skill in the art will realize that the invention embodied within is not restricted to any specific small angle seeder or steering element or device, and that speed and performance of the invention can be adjusted by utilizing faster and more enhanced performance seeders or small angle steering elements at a greater cost. The utilization of various small angle seeders or steering elements in accordance with the invention illustrated in FIG. 6, FIG. 6A and FIG. 6B, and its various embodiments, is readily known to those skilled in the art. As such, the present invention is not limited to the present small angle seeder or steering technology and as that technology develops in the future, it may readily be adapted to the present invention and its range amplification properties as demonstrated herein.

As noted, although concave reflecting surfaces that are a sphere or spherical in shape may be used and paraxial ray values applied as a starting point for relative positioning and spacing, focal power, and curvatures of off-axis embodiments of the invention, such as the embodiments of FIG. 6, FIG. 6A and FIG. 6B, such off-axis embodiments of the invention may likely require optimization. Although the first concave reflecting surface 12 and the second concave reflecting surface 30 in the apparatus illustrated in FIG. 6, FIG. 6A and FIG. 6B are illustrated as spheres or as spherical in shape, it should be noted that this embodiment is not limited only to a concave reflecting surface that is a sphere or is spherical, but is meant to further include, without limitation, any non-spherical concave reflecting surface, including concave reflecting surfaces that are aspherical, or any other suitable curved three-dimensional shape, with the appropriate modification(s) to an embodiment utilizing a non-spherical concave reflecting surface based on the particular focal properties and behavior of such non-spherical reflecting surface as would be appreciated by one skilled in the art. Indeed, as a result of optimization efforts, concave reflecting surfaces that are aspherical may be desired for first concave reflecting surface 12 and second concave reflecting surface 30 in off-axis embodiments of the invention, as illustrated in FIG. 6, FIG. 6A and FIG. 6B. In such embodiments of the system, the two off-axis concave mirrors may be aspheric surfaces selected by using such raytrace optimization programs to minimize or otherwise control the divergence of the output beam.

In addition, it will be appreciated by those skilled in the art that, although principles and methodologies based on and calculated from the focusing properties of a concave spherical mirror for paraxial rays may be utilized as a starting point for positioning and curvatures, the embodiments of FIG. 6, FIG. 6A and FIG. 6B and further off-axis embodiments may require optimization. By way of example, attention is drawn to surfaces 26, 28 and 27 and focusing the beam to said surfaces as disclosed in prior embodiments of the invention configured on a single optical axis. In an off-axis configuration, the paraxial ray values for determining the precise configuration of surfaces 26, 28 and 27, although a starting point, may likely not result in optimal, minimized divergence of the final output beam. This is especially so where the first concave reflecting surface 12 and the second concave reflecting surface 30 are aspherical, a property that may even be desired in an off-axis configuration. Accordingly, it is appreciated by those skilled in the art that although the methodologies, principles and paraxial ray values applied in prior embodiments using concave spherical reflecting surfaces may be used as a starting point, surfaces analogous to surfaces 26, 28 and 27, as adapted to off-axis embodiments, will likely be aspherical and require further optimization for overall curvature and positioning to optimize the off-axis system and to minimize or otherwise control the divergence of the final output beam.

The amplification of the range of beam steering of the small angle steering element 24 in FIG. 6, FIG. 6A and FIG. 6B is the combination of the amplification by both concave reflecting surfaces, 12 and 30. As with prior embodiments, although the constraints for collimation of the final beams restrict the range amplification by the first reflecting surface 12 to a factor of 2, there is no such restriction on the amplification by the second concave reflecting surface 30. By choosing the position of the small angle steering element 24 and the second concave reflecting surface 30 with respect to the radius of curvature of concave reflecting surface 30, the range amplification of second concave reflecting surface 30 can readily be greater than 20. For instance, by making the range amplification of second concave reflecting surface 30 to be 15, the total range amplification of the system of FIG. 6, FIG. 6A and FIG. 6B can be 30 so that a range of beam deflection of +/−1.5 degrees by the small angle steering element 24 can be amplified to a range of +/−45 degrees (30×+/−1.5 degrees =+/−45 degrees), while maintaining good collimation of the output beams.

Furthermore, one of ordinary skill in the art will appreciate that the constraints for collimation of the final beams that restrict the range amplification by the first reflecting surface 12 to a factor of 2 are only necessary for providing an essentially perfectly collimated beam at all angles of deflection. In practice, many useful systems may use output beams having some small range of divergence. Such systems may have a range amplification of first reflecting surface 12 that is significantly greater than 2 resulting in a slight degradation of the collimation of the output beam at various angles of deflection. This degradation of the collimation may be, however, within the tolerances and requirements of the overall system and may represent an adequate compromise in a choice of components. For instance, a system may trade off the cost savings and alignment simplicity of having only one concave reflecting surface and one flat reflecting surface and still achieve a required range amplification that is greater than 2 by relaxing the requirements on the collimation to be within the practical requirements of the particular application.

Figure 7:
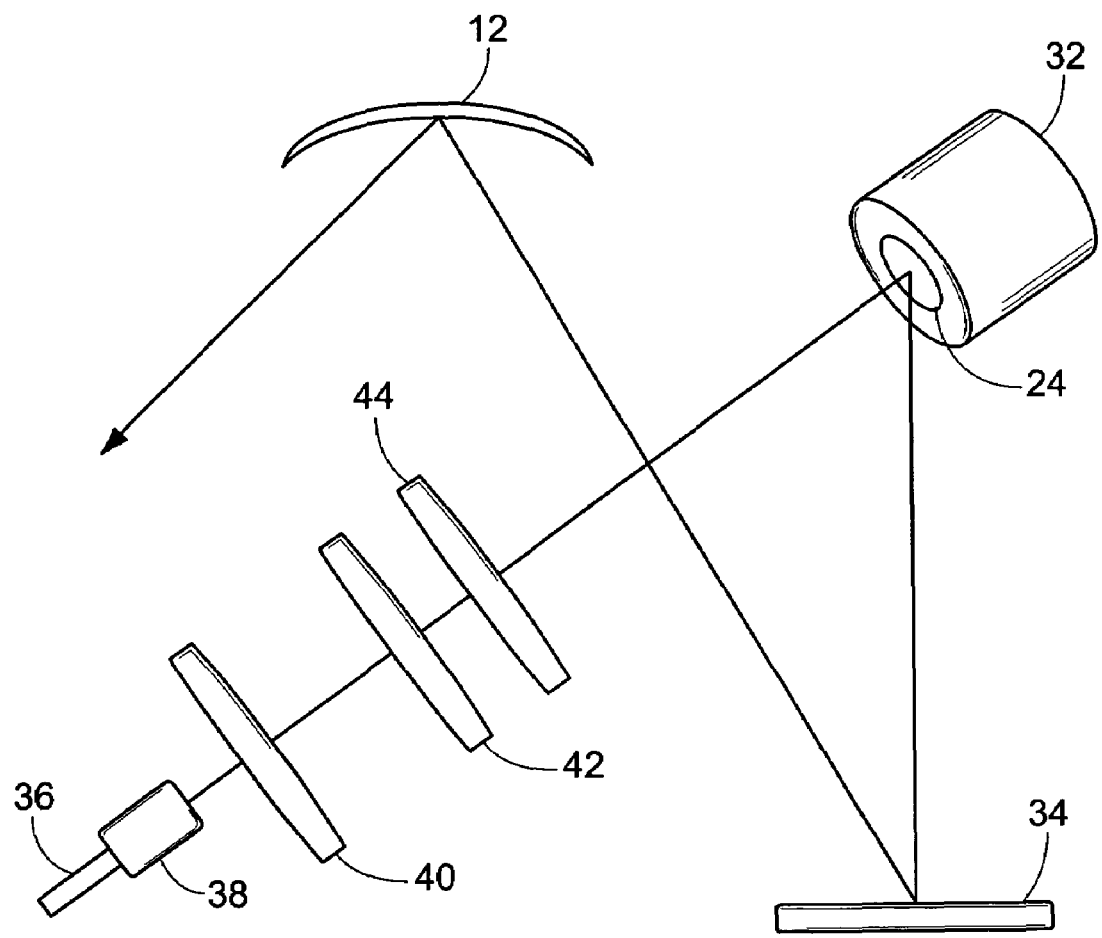
FIG. 7 is a schematic drawing showing an embodiment of a beam steering apparatus having a flat mirror and a spherical mirror.

FIG. 7 is a schematic drawing showing a further embodiment of a beam steering apparatus having a flat mirror and a spherical mirror. A laser beam 36 passes through a collimating lens 38 to a first beam expander lens 40. The first beam expander lens 40 focuses the beam down to a focal point shared with a second beam expander lens 42 resulting in an expanded, collimated beam directed towards a focusing lens 44. The beam expanding lenses effectively controls the width of the output beam. The focusing lens 44 focuses the beam towards the small angle steering element 24 that is attached to an electrically controllable steering platform 32. The small angle steering element 24 directs the beam towards a flat mirror 34. The flat mirror 34 in turn directs the laser beam towards the concave reflecting surface 12. The focusing lens 44 is selected to have a power that focuses the laser beam 36 to a surface x (not shown in FIG. 7) in front of the concave reflecting surface 12 that minimizes the divergence of the final beam, similar to coinciding surfaces 28 and 26 in prior FIGS. 3, 3A, 4, 5, 5A, and 5B, and to analogous surfaces in FIGS. 6, 6A and 6B (not shown in FIGS. 6, 6A and 6B), said surface x in this instance again being a surface determined by a raytracing program based on system parameters. However, as with all off-axis configurations or embodiments of the invention, concave reflecting surfaces that are a sphere or spherical in shape may be used and paraxial ray values applied as a starting point for relative positioning and spacing and other parameters as discussed previously herein. Although only the zero-deflection beam, i.e., the beam passing through the system when the small angle steering mirror is at the mid-point of its range, is shown in FIG. 7, it is understood that the small angle steering element 24 steers the beam over a three dimensional range of angles that are amplified by the concave reflecting surface 12 in accordance with the principles and methodology described herein. The following is an example of this embodiment of the invention.

EXAMPLE ONE

One embodiment of the invention illustrated schematically by FIG. 7 had components having the following properties and locations. The fiber collimating lens 38 had a focal length of 4.6 mm and was separated from the first beam expander lens 40 by a distance of 5 mm. The first beam expander lens 40 had a focal length of 25 mm and was separated from the second beam expander lens 42 by a distance of 67 mm. The second beam expander lens 42 had a focal length of 50 mm and was separated from the focusing lens 44 by 20 mm. The focusing lens 44 had a focal length of 120 mm and was separated from the small angle steering element 24 by a distance of 110 mm. The small angle steering element 24 had an angular range of +/−1.5 degrees and was separated from the flat mirror 34 by a distance of 135 mm. The flat mirror 34 was separated from the spherical concave reflecting surface 12 by a distance of 70 mm. The concave reflecting surface 12 had a focal length of 25 mm. One of ordinary skill in the art will realize that the invention embodied in FIG. 7 is not restricted to these exact values, but could be achieved by scaling the values or using suitably adjusted sets of values such as, but not limited to, adjusting distances to compensate for changes in focal length.

The beam used in Example One, but not limited thereto, included a HeNe laser at a wavelength of 630 nm, with a demonstrated power of from 5 mW to 500 mW and a bandwidth capability of 2.5 Gb/sec. Deploying current laser technology known to those skilled in the art, the embodiment of the invention disclosed in Example One can be modulated at 40 Gb/sec. One of ordinary skill in the art will further realize that the invention embodied in FIG. 7 is not restricted to the exact beam disclosed, and that the present invention's rapid, high precision, wide angle beam steering features could be used with numerous electromagnetic radiation beam sources of various frequencies, bandwidth, power, and other variables known to those in the art, such additional beams including, but not limited to, infrared (IR) beams, invisible laser beams, etc. The small angle seeder or steering element used in Example One was a +/−1.5 degree piezo-electric seeder with SGS (Strain Gauge Sensor, control servo-loop).

Figure 8:
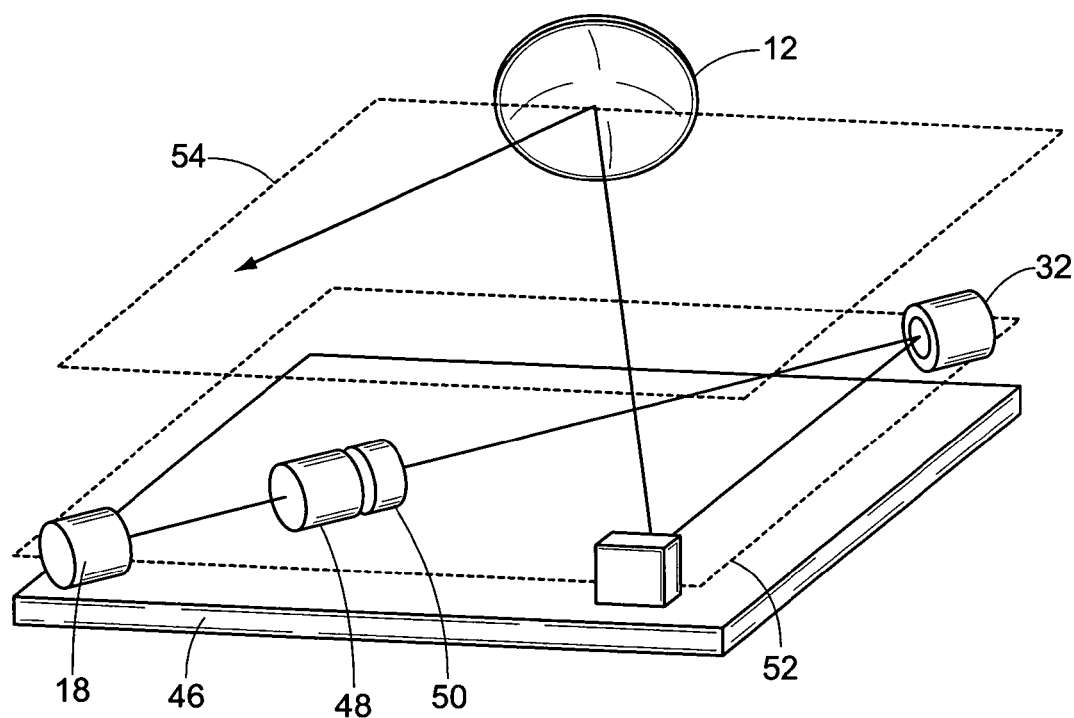
FIG. 8 is a further view of the invention illustrated in FIG. 7.

FIG. 8 is a perspective view of an embodiment similar to the invention illustrated in FIG. 7 showing how the centers of the components lie in one of plane 52 and plane 54. In particular, the optical centers of the light source 18, the beam collimator 48, the achromatic focusing lens 50, the electrically controllable steering platform 32 and the flat mirror 34 all line in plane 52, while the optical center of the concave reflecting surface 12 lies in plane 54. The plane 52 and the plane 54 are both parallel to the base support 46, with, in the specific example illustrated above, the plane 52 being 83 mm above base support 46 and plane 54 being 125 mm above the base support 46. The light source 18 may, for instance, comprise the fiber collimating lens 38 of FIG. 7, while the beam collimator 48 may comprise the first and second beam expander lenses 40 and 42 of FIG. 7, while the achromatic focusing lens 40 and the focusing lens 44 of FIG. 7 may be functionally equivalent.

Figure 9:
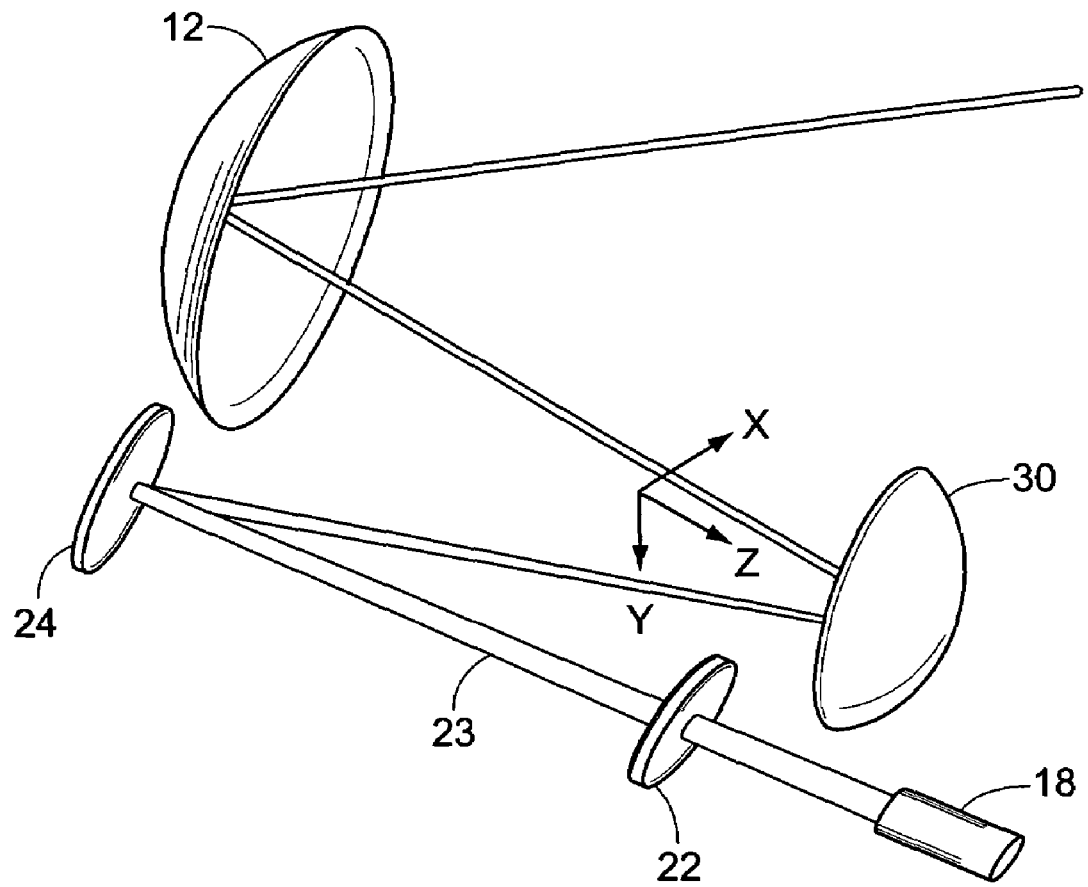
FIG. 9 is a further illustration of a beam steering apparatus having two spherical mirrors and a reasonably collimated output beam.

FIG. 9 is a further illustration of a beam steering apparatus having two off-axis spherical mirrors and a reasonably collimated output beam, such as that illustrated in FIGS. 6, 6A and 6B, comprising a light source 18, a divergence control lens 22, a small angle steering element 24, a second reflecting surface 30 and a first concave reflecting surface 12. In the exemplary embodiment of the invention, as illustrated in FIG. 9, the position of the optical components are illustrated with reference to a three dimensional set of Cartesian coordinates oriented according to the three unit vectors of the coordinate system, shown as arrows labeled X, Y, and Z.

The amplification of the range of beam steering of the small angle steering element 24 in FIG. 9 is the combination of the amplification by both concave reflecting surfaces, 12 and 30. As with prior embodiments, although the constraints for collimation of the final beams restrict the range amplification by the first reflecting surface 12 to a factor of 2, there is no such restriction on the amplification by the second concave reflecting surface 30. By choosing the position of the small angle steering element 24 and the second concave reflecting surface 30 with respect to the radius of curvature of concave reflecting surface 30, the range amplification of second concave reflecting surface 30 can readily be greater than 20. For instance, by making the range amplification of second concave reflecting surface 30 to be 15, the total range amplification of the system of FIG. 9 can be 30 so that a range of beam deflection of +/−1.5 degrees by the small angle steering element 24 can be amplified to a range of +/−45 degrees (30×+/−1.5 degrees =+/−45 degrees), while maintaining good collimation of the output beams.

Furthermore, one of ordinary skill in the art will appreciate that the constraints for collimation of the final beams that restricts the range amplification by the first reflecting surface 12 to a factor of 2 are only necessary for providing an essentially perfectly collimated beam at all angles of deflection. In practice, many useful systems may use output beams having some small range of divergence. Such systems may have a range amplification of first reflecting surface 12 that is significantly greater than 2 resulting in a slight degradation of the collimation of the output beam at various angles of deflection. This degradation of the collimation may, however, be within the tolerances and requirements of the overall system and may represent an adequate compromise in a choice of components. For instance, a system may trade off the cost savings and alignment simplicity of having only one concave reflecting surface and one flat reflecting surface and still achieve a required range amplification that is greater than 2 by relaxing the requirements on the collimation to be within the practical requirements of the particular application.

EXAMPLE TWO

In one exemplary embodiment of the invention as illustrated in FIG. 9, the position of the optical components will now be described by reference to a 3 dimensional set of Cartesian coordinates oriented according to the three unit vectors of the coordinate system, shown as arrows labeled X, Y, and Z in FIG. 9. In the exemplary embodiment, the light source 18 was situated at coordinates x, y, z (0, 37, 42) (mm), while the divergence control lens 22 had focal length of 150 mm, a diameter of 25 mm and was situated at x, y, z coordinates (0, 28, 9) (mm). The small angle steering element 24 had a steering range of approximately 3 degrees and was situated at x, y, z coordinates (0, 8, −60) (mm), so that the distance between the small angle steering element 24 and the divergence control lens 22 was 71.84 mm. The second reflecting surface 30 was a spherical reflector having a focal length of 20 mm situated at x, y, z coordinates (0,0,40), so that the distance between the second reflecting surface 30 and the small angle steering element 24 was 100.31 mm. The concave reflecting surface 12 was a spherical reflector having a focal length of 20 mm and situated at x, y, z coordinates (0, −33, −58) (mm), so that the distance between the concave reflecting surface 12 and the second reflecting surface 30 was 103.41 mm. One of ordinary skill in the art will realize that these specific values are illustrative and that embodiments of the invention may be constructed using different values and placing of components by, for instance, changing the scaling or units of all the components or by, for instance, adjusting corresponding focal lengths and distances. The system of FIG. 9 allows the amplification of the small angle deflection of +/−1.5 degrees to a large angle steering angle of +/−45 degrees. The angular speed of such devices may be in the range of 1 KHz, with a pointing accuracy of 1 micro-radian.

The beam used in Example Two, but not limited thereto, included a HeNe laser at a wavelength of 630 nm, with a demonstrated power of from 5 mW to 500 mW and a bandwidth capability of 2.5 Gb/sec. Deploying current laser technology known to those skilled in the art, the embodiment of the invention disclosed in Example Two could be modulated at 40 Gb/sec. One of ordinary skill in the art will further realize that the invention embodied in FIG. 9 is not restricted to the exact beam disclosed, and that the present invention's rapid, high precision, wide angle beam steering features but could used with numerous beam sources of various frequencies, bandwidth, power, and other variables known to those in the art, such additional beams including, but not limited to other forms of electromagnetic beams, such as infrared (IR) beams, invisible laser beams, etc. The small angle seeder or steering element used in Example Two was a +/−piezo-electric seeder with SGS (Strain Gauge Sensor, control servo-loop).

Figure 9A:
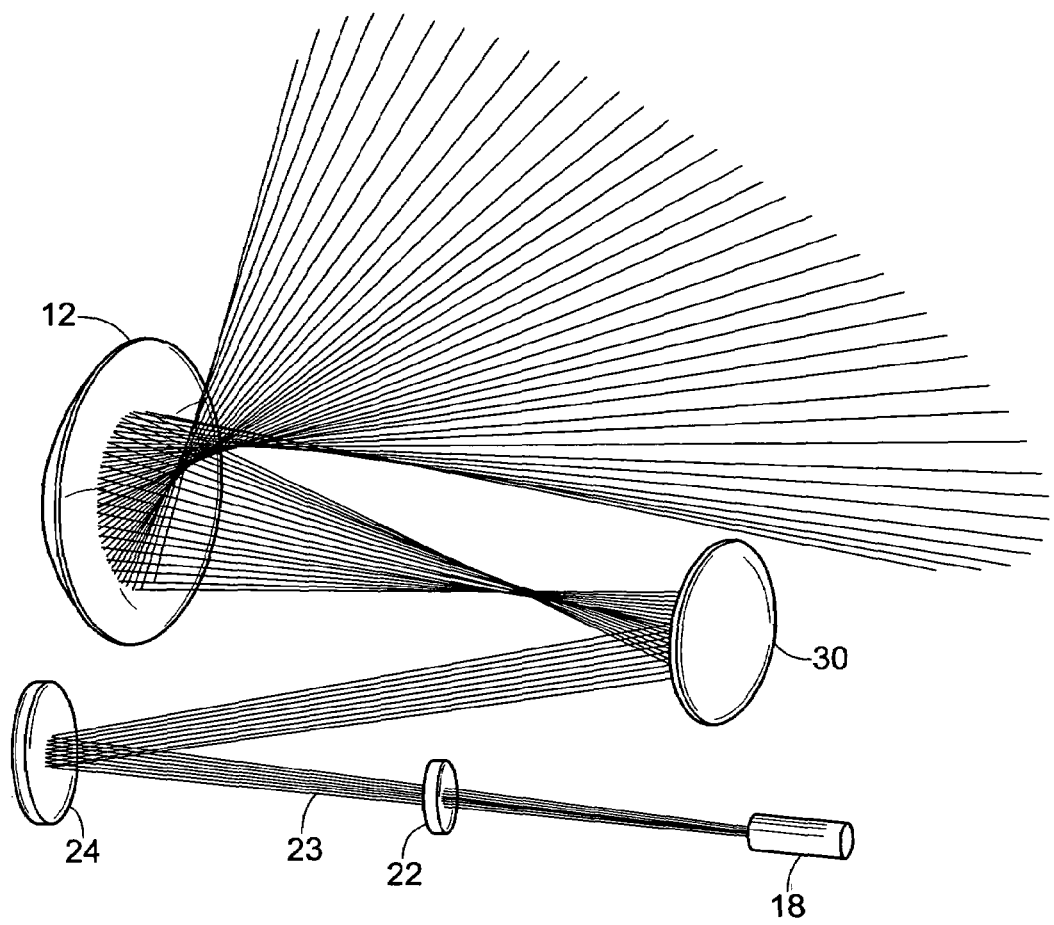
FIG. 9A is a further illustration of a beam steering apparatus having two spherical mirrors and a reasonably collimated output beam, showing a plurality of beam steering angles.

FIG. 9A is a further illustration of a beam steering apparatus having two off-axis spherical mirrors and a reasonably collimated output beam, as illustrated in FIGS. 6, 6A, 6B and 9, now showing a plurality of output beam steering angles and the enormous steering angle amplification achieved by the present invention. The final output angle of the beam reflected from first concave reflecting surface 12 depends on the rapid, high-precision fine angle steering of the beam by the small angle steering element 24. As FIG. 9A demonstrates, the laser beam originating from light source 18 can be rapidly, and with high precision, steered in large final output angles, all without the use of large or "macro-mechanical" elements or features. The system of FIG. 9A allows the amplification of the small angle deflection of +/−1.5 degrees to a large angle steering angle of +/−45 degrees. The angular speed of such devices as in FIGS. 6, 6A, 6B, 9 and 9A may be in the range of 1 KHz, with a pointing accuracy of 1 micro-radian.

Figure 10:
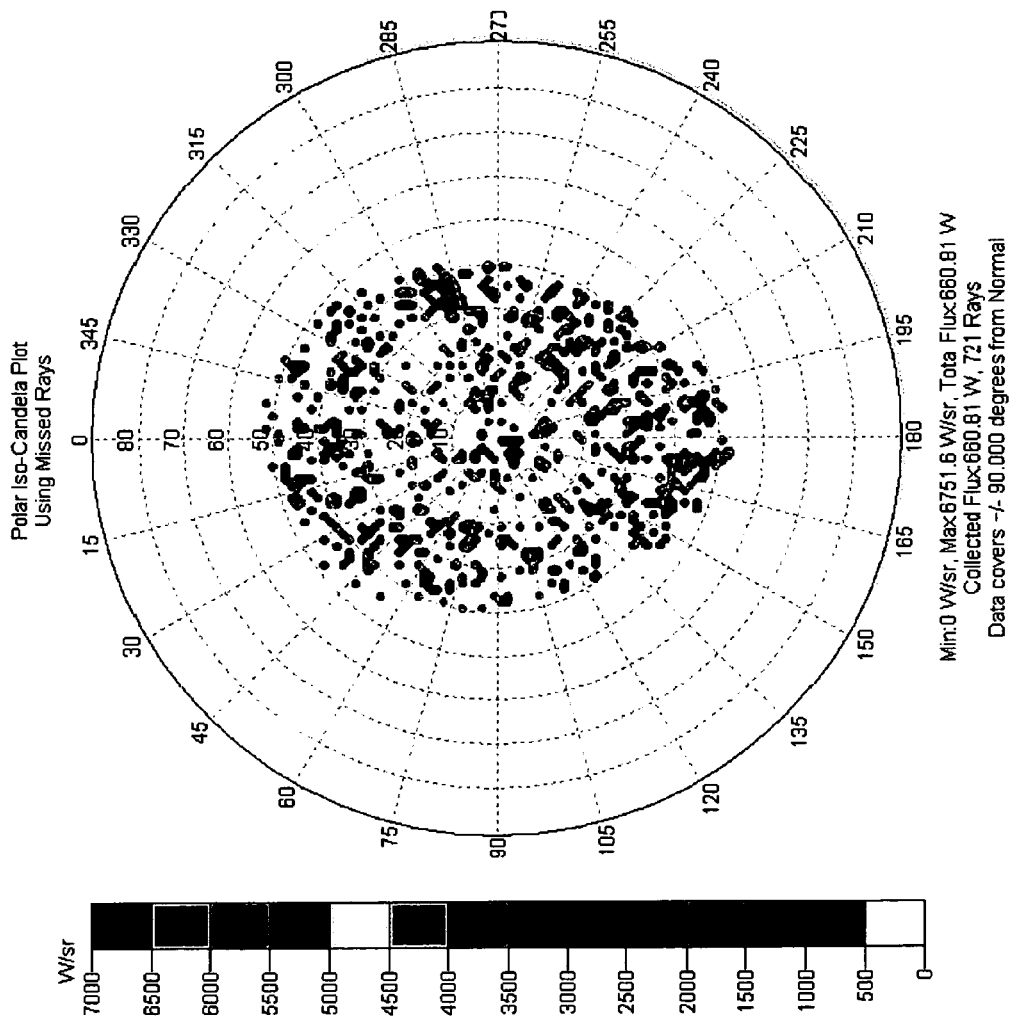
FIG. 10 is a polar iso-candela plot showing the output of the invention as embodied in the apparatus of FIG. 9.

FIG. 10 is a polar iso-candela plot showing the output of the invention as embodied in the apparatus of FIG. 9 using the components detailed above. The plot shows the constant power profile of a large number of output beams plotted on polar co-ordinates. Although some of the rays overlap, the un-overlapped beam plots show that the angular range of the output beam is a solid slightly flattened cone that subtends +/−45 degrees on one axis and +/−50 degrees on an orthogonal axis. Importantly, the plot has areas without spots, indicating that there are with no blind spots or obstructions in the required range of deflection. The rays also have substantially uniform size in all sectors of the plot, showing that they are collimated within the required tolerances for all angles of deflection.

Figure 11:
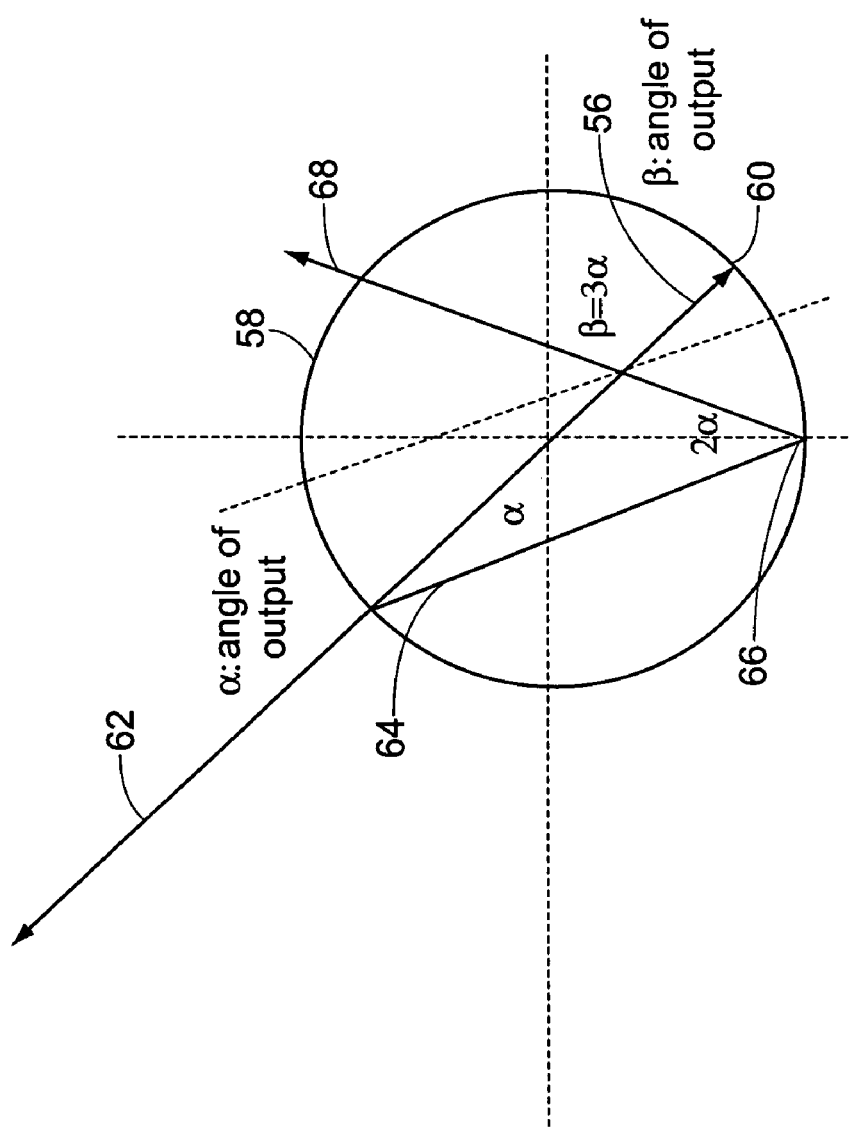
FIG. 11 is an illustration of magnification of an input angle using a spherical reflector.

FIG. 11 is an illustration of the magnification of an input angle using a spherical reflector. In particular, an input ray 56 passing through the center of a sphere 58 is incident normally to the sphere at point 60 and is reflected as ray 62. A second input ray 64, at an angle α to the first ray is incident on the sphere 58 at point 66 and is reflected through 2α degrees to emerge as output ray 68. The total angle between output rays 62 and 68, β, is therefore 3α degrees, or a factor of 3 for this geometrical arrangement.

Figure 12:
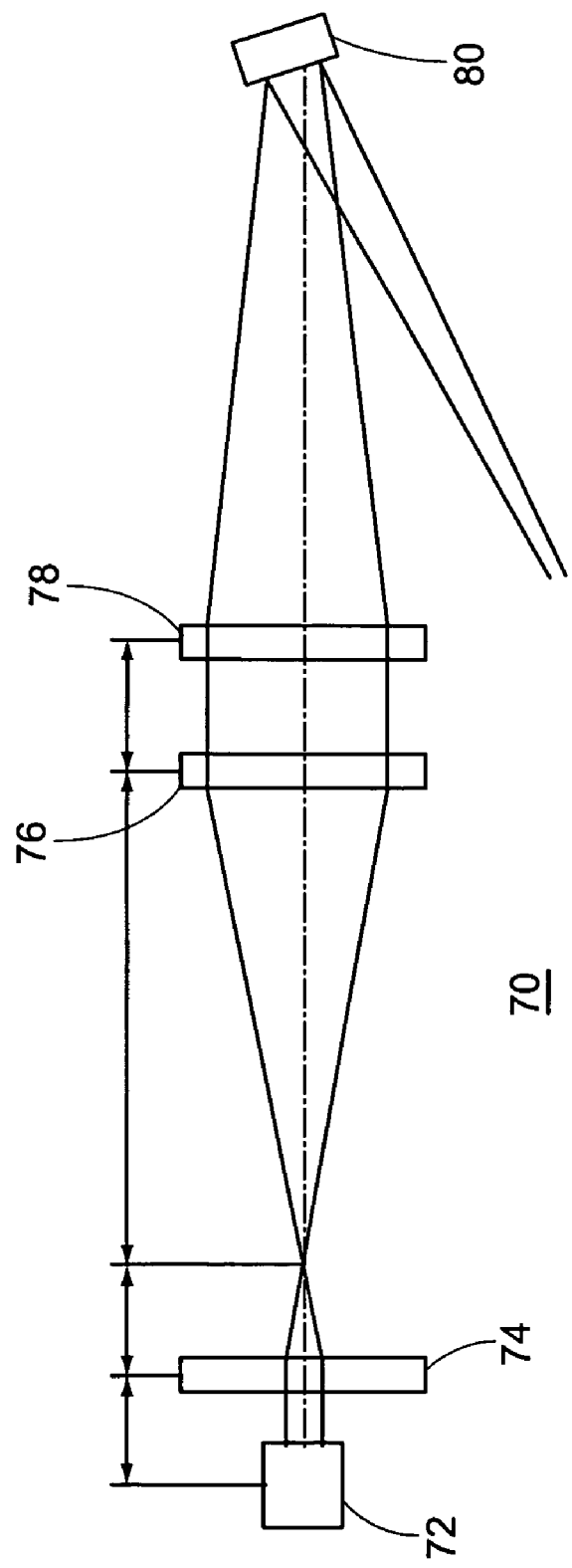
FIG. 12 is a schematic drawing showing an embodiment of a beam steering apparatus having a fiber collimator, a first, second and third lens, and a tuning mirror.

FIG. 12 is a schematic version of a beam expander and collimator 70, comprising a fiber collimator 72, a first lens 74, a second lens 76 and a third lens 78 directed to a tuning mirror 80. Although the collimator 70 is well known in the art, it may be used in all embodiments of the invention discussed above and the particular design illustrated above simplifies the choice of components by making the position of the first focal point of the beam entirely dependent on the selection of the third lens 78, which becomes the divergence control lens 22.

In an illustrative embodiment of the collimator 70, fiber collimator 72 is separated from first lens 74 by 20 mm. The first lens 74 has a focal length of 25 mm and is separated from the second lens 76 by 100 mm. The second lens 76 has a focal length of 75 mm and is separated from the third lens 78 by 20 mm. The third lens 78 has a focal length of 150 mm. A widened parallel beam is produced by having the focal points of the first and second lenses coincide. The widening of the beam is equal to the ratio of the focal lengths and in this example is a factor of 3. The third lens has a focal length of the appropriate value to focus the beam to the plane required by the various reflecting surfaces of the invention, as detailed in the examples above. The values in this example are merely illustrative and one of ordinary skill in the art will appreciate that a collimator 70 is not restricted to these exact values, but could be achieved by scaling the values or using suitably adjusted sets of values such as, but not limited to, adjusting distances to compensate for changes in focal length.

One of ordinary skill in the art would also realize that other optical arrangements could be used for shaping and focusing the input beam to the required location with out departing from the inventive concepts of the invention as a whole.

Although the invention has been described using concave spherical optics, it will be appreciated by one of ordinary skill in the art that each of the concave spherical surfaces may be replaced by a suitable aspheric surface derived by, for instance, optimizing raytracing using any of the optical ray trace packages that are commercially available including, but not limited to, the TracePro™ program supplied by Lambda Research, Inc. of Littleton, Mass.

The terminology used and methodology described in the foregoing description of the invention contemplates use of the beam steering method, system and device in conjunction with an optical transmitter, but it will be appreciated by those of ordinary skill in the art that the invention may also be used in conjunction with an optical receiver, such as an optical communications system. In the context of an optical transmitter, the invention employs a source of an electro-magnetic radiation beam, such as a beam of light, and in particular, a laser beam. The high-speed mechanism deflects the laser beam through relatively small, high-precision angles, moving the beam successively from one focusing element to the next, which amplifies the angular range (field of regard) of the beam, in order to achieve rapid, high-precision, large angle agile beam steering.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

While the foregoing is directed to various embodiments of the invention, other and further embodiments of the invention may be devised without departing from the basic scope thereof, and the scope thereof is determined by the claims that follow.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

Further, the purpose of the foregoing description and abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

As to the manner of usage and operation of the present invention, the same should be apparent from the above description. Accordingly, no further discussion relating to the manner of usage and operation will be provided.

What is claimed is:

1. A device for rapid, large angle steering of a beam of light emitted by a light source, comprising:
    a concave reflecting surface having a first focal length;
    a small angle steering element positioned so as to steer said beam of light towards said concave reflecting surface over a first range of angles such that the reflected beam, reflected from said concave reflecting surface, traverses a second range of angles, and wherein said second range of angles exceeds said first range of angles; and
    a divergence control lens having a second focal length positioned so as to focus said beam of light to a surface that is essentially said first focal length from said concave reflecting surface, thereby providing a reflected beam that is essentially collimated.

2. The device of claim 1 wherein said concave reflecting surface is a sphere.

3. The device of claim 1 wherein said concave reflecting surface is an aspheric surface.

4. The device of claim 2 wherein said small angle steering element is located at a position that is 1.5 times a radius of said concave reflecting surface from said concave reflecting surface.

5. The device of claim 2 further comprising a collimating lens, a beam expander and a flat mirror, and wherein optical centers of said light source, said collimating lens, said beam expander, said small angle steering element and said flat mirror all lie essentially in a first plane, while an optical center of said concave reflecting surface lies in a second, parallel plane.

6. The device of claim 1 further comprising a second concave reflecting surface having a third focal length and located such that said beam of light steered from said small angle steering element is directed to said first concave reflecting surface via said second concave reflecting surface.

7. The device of claim 6 wherein said second concave reflecting surface is located such that said beam of light steered by said small angle steering element is reflected off said second concave reflecting surface to essentially pass through a point that is the optical axis of said first concave reflecting surface and a distance 1.5 times the radius of said first concave reflecting surface from said first concave reflecting surface.

8. A method of rapid, large angle steering of a beam of light emitted by a light source, comprising:
    deflecting said beam of light over a first range of angles using a small angle steering element;
    amplifying said first range of angles to a second range of angles using a concave reflecting surface having a first focal length; and
    collimating the output beam of said second range of angles using a divergence control lens, said divergence control lens having a second focal length and being positioned so as to focus said beam of light to a surface that is essentially said first focal length from said concave reflecting surface.

9. The method of claim 8 wherein said concave reflecting surface is a sphere.

10. The method of claim 8 wherein said concave reflecting surface is an aspheric surface.

11. The method of claim 9 wherein said small angle steering element is located at a position that is 1.5 times a radius of said concave reflecting surface from said concave reflecting surface.

12. The method of claim 9 further comprising providing a collimating lens, a beam expander and a flat mirror, and wherein said light source, said collimating lens, said beam expander, said small angle steering element and said flat mirror are all located such that their optical centers all lie essentially in a first plane, while said concave reflecting surface is located such that its optical center lies in a second, parallel plane.

13. The method of claim 8 further comprising locating a second concave reflecting surface having a third focal length such that said beam of light steered from said small angle steering element is directed to said first concave reflecting surface via said second concave reflecting surface.

14. The method of claim 13 wherein said second concave reflecting surface is located such that said beam of light steered by said small angle steering element is reflected off said second concave reflecting surface to essentially pass through a point that is the optical axis of said first concave reflecting surface and a distance 1.5 times the radius of said first concave reflecting surface from said first concave reflecting surface.

15. A apparatus for rapid, large angle steering of a beam of light emitted by a laser, comprising:
    small angle steering means for deflecting said beam of light over a first range of angles;
    spherical reflecting means for amplifying said first range of angles to a second range of angles, said concave reflecting means having a first focal length; and
    divergence control lens means for collimating the output beam of said second range of angles, said divergence control lens means having a second focal length and being positioned so as to focus said beam of light to a surface that is essentially said first focal length from said concave reflecting surface.

16. The apparatus of claim 15 wherein said small angle steering means is effectively located at a position that is 1.5 times a radius of said spherical reflecting surface from said spherical reflecting surface, and further comprising a beam expanding means and a flat mirror, and wherein said laser, said collimating lens means, said beam expanding means, said small angle steering means and said flat mirror are all located such that their optical centers all lie essentially in a first plane, while said spherical reflecting means is located such that its optical center lies in a second, parallel plane.

17. The apparatus of claim 15 further comprising locating a second spherical reflecting means having a third focal length such that said beam of light steered from said small angle steering means is directed to said first spherical reflecting means via said second spherical reflecting means.

18. The apparatus of claim 17 wherein said second spherical reflecting means is located such that said beam of light steered by said small angle steering means is reflected off said second spherical reflecting means to essentially pass through a point that is the optical axis of said first spherical reflecting surface and a distance 1.5 times the radius of said first spherical reflecting surface from said first spherical reflecting surface.

* * * * *